United States Patent
Wu et al.

(10) Patent No.: US 12,476,701 B2
(45) Date of Patent: Nov. 18, 2025

(54) TECHNIQUES TO HANDLE INTERRUPTION IN SATELLITE-BASED COMMUNICATIONS

(71) Applicant: QUALCOMM Incorporated, San Diego, CA (US)

(72) Inventors: Shuanshuan Wu, San Diego, CA (US); Gene Wesley Marsh, San Diego, CA (US); Shailesh Patil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 298 days.

(21) Appl. No.: 18/073,532

(22) Filed: Dec. 1, 2022

(65) Prior Publication Data

US 2024/0187090 A1    Jun. 6, 2024

(51) Int. Cl.
H04B 7/185    (2006.01)

(52) U.S. Cl.
CPC ..... H04B 7/18536 (2013.01); H04B 7/18545 (2013.01)

(58) Field of Classification Search
None
See application file for complete search history.

(56) References Cited

U.S. PATENT DOCUMENTS

| | | | |
|---|---|---|---|
| 9,572,080 B1 | 2/2017 | Wang et al. | |
| 9,763,265 B2* | 9/2017 | Kazmi | H04W 74/004 |
| 11,924,908 B1* | 3/2024 | Paczkowski | H04W 76/30 |
| 2015/0092657 A1 | 4/2015 | Ferrarotti et al. | |
| 2019/0342898 A1* | 11/2019 | Nam | H04W 72/0446 |
| 2020/0389847 A1* | 12/2020 | Deng | H04W 52/0219 |
| 2021/0282211 A1* | 9/2021 | Pezeshki | H04W 76/19 |
| 2021/0328663 A1 | 10/2021 | Ravishankar et al. | |
| 2021/0360725 A1* | 11/2021 | Tang | H04W 24/04 |
| 2021/0385675 A1* | 12/2021 | Määttänen | H04B 7/1851 |
| 2022/0022064 A1* | 1/2022 | Raghavan | H04W 24/10 |
| 2022/0038933 A1* | 2/2022 | Ma | H04L 1/203 |
| 2022/0070701 A1* | 3/2022 | Bedekar | H04W 24/08 |
| 2022/0239360 A1* | 7/2022 | Faxér | H04B 7/0478 |

(Continued)

FOREIGN PATENT DOCUMENTS

| | | |
|---|---|---|
| EP | 2168258 B1 | 3/2018 |
| KR | 101524555 B1 | 5/2015 |

OTHER PUBLICATIONS

International Search Report and Written Opinion—PCT/US2023/078899—ISA/EPO—Feb. 27, 2024.

(Continued)

*Primary Examiner* — Kodzovi Acolatse

(74) *Attorney, Agent, or Firm* — Procopio, Cory, Hargreaves & Savitch LLP/QUALCOMM Incorporated

(57) ABSTRACT

Apparatus, methods, and computer-readable media for facilitating interruption handling in satellite-based communications are disclosed herein. An example method for wireless communication at a UE includes determining an interruption for a satellite-based communication link based in part on UE location information and blockage information of an obstruction that blocks LOS propagation for the satellite-based communication link. The example method also includes refraining performance of one or more communication link correction procedures for a time period associated with the interruption.

30 Claims, 15 Drawing Sheets

(56) References Cited

U.S. PATENT DOCUMENTS

| | | | |
|---|---|---|---|
| 2022/0276389 A1* | 9/2022 | Yu | G01S 19/21 |
| 2022/0386204 A1* | 12/2022 | Parichehrehteroujeni | H04W 36/18 |
| 2023/0044590 A1* | 2/2023 | Pefkianakis | H04B 7/088 |
| 2023/0337269 A1* | 10/2023 | Rao | H04B 7/0695 |
| 2024/0031844 A1* | 1/2024 | Jeong | H04W 76/19 |
| 2024/0172302 A1* | 5/2024 | Rakshit | H04W 4/44 |
| 2024/0251031 A1* | 7/2024 | Bakker | H04W 36/305 |
| 2024/0364400 A1* | 10/2024 | Muruganathan | H04L 5/0048 |

OTHER PUBLICATIONS

3GPP TR 38.821: "3rd Generation Partnership Project; Technical Specification Group Radio Access Network; Solutions for NR to Support Non-terrestrial Networks (NTN) (Release 16)", 3GPP TR 38.821, V16.1.0, May 2021, pp. 1-140.

* cited by examiner

US 12,476,701 B2

TECHNIQUES TO HANDLE INTERRUPTION IN SATELLITE-BASED COMMUNICATIONS

INTRODUCTION

The present disclosure relates generally to communication systems, and more particularly, to wireless communication employing satellite-based communications.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IOT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method of wireless communication at a user equipment (UE) is provided. The method may include determining an interruption for a satellite-based communication link based in part on UE location information and blockage information of an obstruction that blocks line-of-sight (LOS) propagation for the satellite-based communication link. The example method may also include refraining performance of one or more communication link correction procedures for a time period associated with the interruption.

In another aspect of the disclosure, an apparatus for wireless communication is provided. The apparatus may be a UE that includes a memory and at least one processor coupled to the memory, the at least one processor may be configured to determine an interruption for a satellite-based communication link based in part on UE location information and blockage information of an obstruction that blocks LOS propagation for the satellite-based communication link. The at least one processor may also be configured to refrain performance of one or more communication link correction procedures for a time period associated with the interruption.

In another aspect of the disclosure, an apparatus for wireless communication at a UE is provided. The apparatus may include means for determining an interruption for a satellite-based communication link based in part on UE location information and blockage information of an obstruction that blocks LOS propagation for the satellite-based communication link. The example apparatus may also include means for refraining performance of one or more communication link correction procedures for a time period associated with the interruption.

In another aspect of the disclosure, a non-transitory computer-readable storage medium storing computer executable code for wireless communication at a UE is provided. The code, when executed, may cause a processor to determine an interruption for a satellite-based communication link based in part on UE location information and blockage information of an obstruction that blocks LOS propagation for the satellite-based communication link. The example code, when executed, may also cause the processor to refrain performance of one or more communication link correction procedures for a time period associated with the interruption.

In an aspect of the disclosure, a method of wireless communication at a base station is provided. The method may include determining an interruption for a satellite-based communication link with a UE based in part on UE location information and blockage information of an obstruction that blocks LOS propagation for the satellite-based communication link. The example method may also include refraining scheduling of communications with the UE for a time period associated with the interruption.

In another aspect of the disclosure, an apparatus for wireless communication is provided. The apparatus may be a network entity that includes a memory and at least one processor coupled to the memory, the at least one processor configured to determine an interruption for a satellite-based communication link with a UE based in part on UE location information and blockage information of an obstruction that blocks LOS propagation for the satellite-based communication link. The at least one processor may also be configured to refrain scheduling of communications with the UE for a time period associated with the interruption.

In another aspect of the disclosure, an apparatus for wireless communication at a base station is provided. The apparatus may include means for determining an interruption for a satellite-based communication link with a UE based in part on UE location information and blockage information of an obstruction that blocks LOS propagation for the satellite-based communication link. The example apparatus may also include means for refraining scheduling of communications with the UE for a time period associated with the interruption.

In another aspect of the disclosure, a non-transitory computer-readable storage medium storing computer executable code for wireless communication at a network entity is provided. The code, when executed, may cause a processor to determine an interruption for a satellite-based communication link with a UE based in part on UE location information and blockage information of an obstruction that blocks LOS propagation for the satellite-based communication link. The example code, when executed, may also cause the processor to refrain scheduling of communications with the UE for a time period associated with the interruption.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
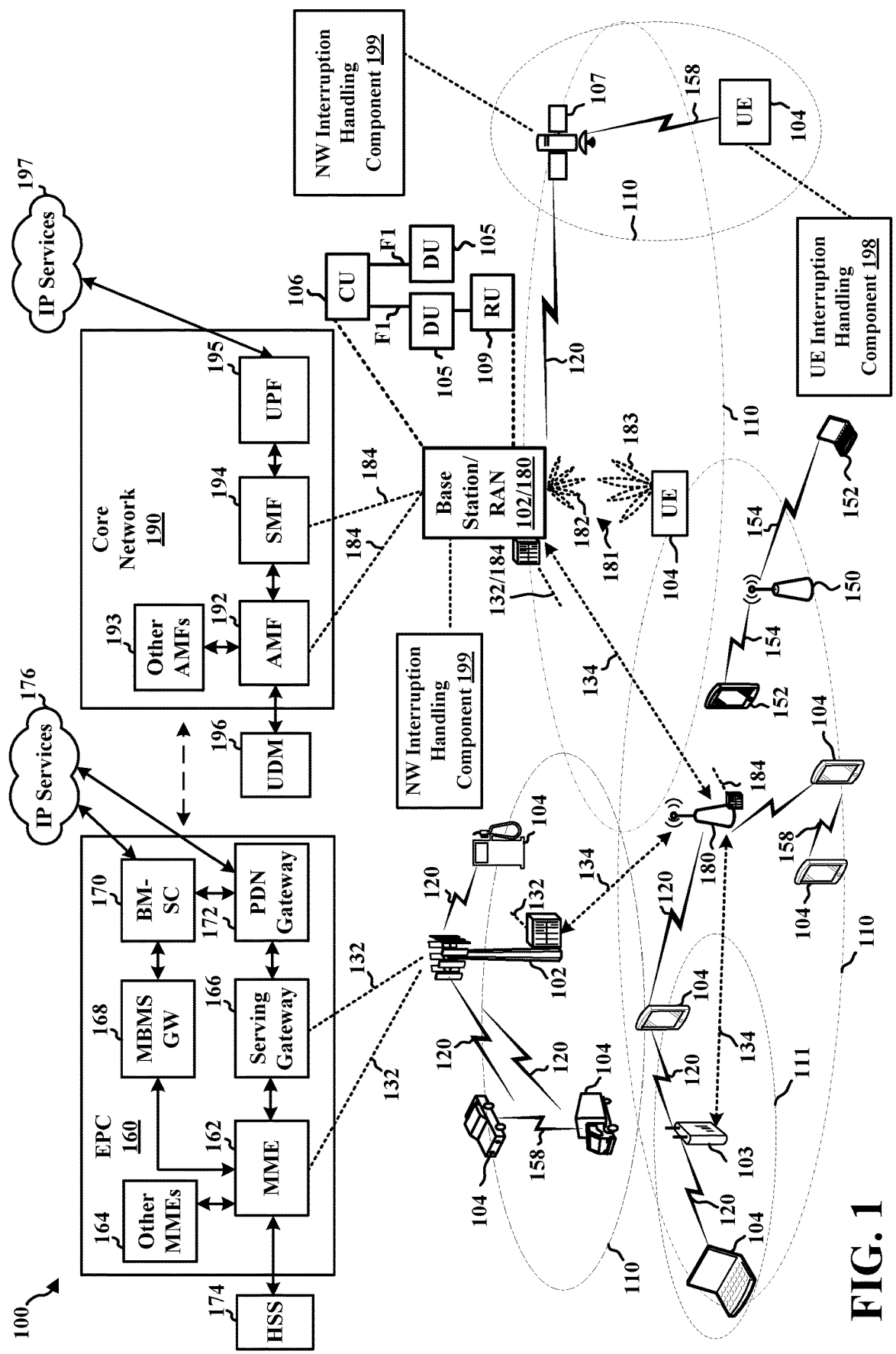
FIG. 1 is a diagram illustrating an example of a wireless communications system and an access network (NW).

Various aspects relate generally to wireless communication and more particularly to satellite-based communication with a UE, such as a vehicle (which may also be referred to as "vehicular satellite-based communication" herein). Some aspects more specifically relate to handling of interruptions of a satellite-based communication link between a UE and a satellite due to an obstruction that blocks line-of-sight (LOS) propagation of a signal between the UE and the satellite.

In some aspects, a UE (e.g., a vehicle) may be configured to communicate with other devices. For example, a connected vehicle may refer to a vehicle that is equipped with an on-board unit (OBU) that enables the vehicle to perform vehicle-based communication. The connected vehicle (which may also be referred to as a "vehicle UE" or a "UE" herein) may communicate with other OBUs (e.g., other vehicles equipped with an OBU), Road Side Units (RSU) (e.g., road infrastructure nodes), Vulnerable Road Users (VRUs) (e.g., scooters, smart phone of pedestrians, etc.), etc. The connected vehicle may be configured to communicate from vehicle-to-vehicle (V2V), vehicle-to-infrastructure (V2I) (e.g., from the connected vehicle to road infrastructure nodes such as an RSU), vehicle-to-network (V2N) (e.g., from the connected vehicle to one or more network nodes, such as a base station or a component of a base station), vehicle-to-pedestrian (V2P), cellular vehicle-to-everything (C-V2X), and/or a combination thereof and/or with other devices, which can be collectively referred to as vehicle-to-anything (V2X) communications.

In some aspects, the connected vehicle may communicate with other devices via sidelink. In some aspects, the connected vehicle may communicate with other devices over a cellular network, for example, over a Uu link. In some aspects, the connected vehicle may communicate with other devices via satellite-based communication. In some aspects, the satellite-based communication may be complementary to the sidelink communication or the Uu link communication, for example, to provide ubiquitous connectivity.

According to one or more examples, satellite-based communication may be based on technologies specified by 3GPP or by private satellite communication systems. A satellite communication system may provide service coverage to areas where a terrestrial network may be unable to provide service coverage, such as rural areas. In a satellite communication system, a UE may connect over-the-air with a base station (or a component of a base station) via a satellite. As used herein, a satellite may also refer to an aerial device, such as an unmanned aircraft system (UAS) platform, a balloon, a drone, an unmanned aerial vehicle (UAV), etc., that provides a UE access to a network (e.g., an NTN) via a satellite-based communication link.

Communication via a satellite-based wireless channel may be characterized via LOS propagation between the UE and the satellite. In scenarios in which a signal may travel directly (e.g., without reflecting off an object) between the UE and the satellite, the satellite-based wireless channel may be characterized via strong LOS propagation. Even with LOS propagation, it is possible for a signal to reflect off an object before reaching its intended target (e.g., the UE or the satellite). As the number of reflections increases and the degree with which the signal reflects of an object increases, the communication via the satellite-based wireless channel may be characterized via weak LOS propagation or non-LOS (NLOS) propagation. However, a UE with the capability to be mobile (e.g., a vehicle with the capability to move, such as a car, a train, a boat, etc.) may encounter an obstruction over time, such as an overpass, an interexchange, a bridge, etc. Such obstructions may result in blockage of LOS between the UE and the satellite and, thus, may interrupt satellite-based communication.

Aspects disclosed herein facilitate a UE and/or a network entity (e.g., a satellite, a base station, a component of a base station, etc.) to predict an occurrence of an interruption due to a blockage of LOS propagation between the UE and the satellite facilitating satellite-based communication with the UE. In some aspects, based on the predicted interruption, the UE and/or the network entity may refrain from performing one or more procedures to mitigate the impact of the interruption in the communication link between the UE and the satellite.

Aspects disclosed herein provide techniques for predicting an interruption in a communication link between a UE and a satellite, for example, due to an obstruction in the path of a UE (e.g., a vehicle). For example, according to one aspect, disclosed techniques include using location information of an obstruction to predict an interruption in a satellite-based communication link between a UE and a satellite may occur. A network entity (e.g., a satellite, a base station, a component of a base station, etc.) and the UE may then exchange information regarding the predicted interruption. In some aspects disclosed herein, the network entity and the UE may each perform at least one action to mitigate the impact from the predicted interruption.

In some aspects disclosed herein, a network entity may predict the occurrence of the interruption in the communication link due to an obstruction. In other aspects, the UE may predict the occurrence of the interruption in the communication link due to an obstruction. As used herein, an obstruction may refer to an object that may block LOS propagation of a signal between a UE and a satellite, such as an overpass, an interexchange, a bridge, etc. The predicting device (e.g., the UE and/or the network entity) may predict the interruption based in part on blockage information associated with an obstruction in a path of the UE. For example, the predicting device may have access to a digital map that includes information regarding location, size, etc. of obstructions. As used herein, a digital map may refer to a representation of a region saved in a digital format. The digital map may include information regarding topography of the region, and/or information (e.g., location, size, etc.) of landmarks, such as roads, bridges, overpasses, exits, etc. The predicting device may also have access to location information of the UE (e.g., the vehicle). For example, the network entity may have access to UE location information to facilitate satellite-based communication with the UE. The UE location information may include coordinates (e.g., geo-coordinates) of the UE, may include a velocity of the UE (e.g., a speed of travel of the UE and a direction of travel of the UE), etc.

The predicting device may use the UE location information and the blockage information to predict an occurrence of an interruption in the communication link between the UE and the satellite. For example, based on a direction of travel of the UE and location information of an obstruction, the predicting device may predict that the UE and the satellite may experience an interruption (e.g., a blockage of LOS propagation) in their communication link. The predicting device may also predict an interruption duration that the UE and the satellite may experience the predicted interruption in their communication link. For example, based on a speed of travel of the UE and size information of the obstruction, the predicting device may predict an amount of time associated with the blockage of LOS propagation (e.g., an interruption duration).

In certain aspects disclosed herein, the network entity and the UE may exchange information regarding the predicted interruption in the communication link between the UE and the satellite. For example, after predicting the interruption, the network entity may provide an indication of the predicted interruption to the UE or the UE may provide an indication of the predicted interruption to the network entity. The indication of the predicted interruption may include a time period associated with the interruption duration. The time period may include a duration, a starting time, and/or an ending time. In some examples, the duration of the time period may include a time buffer to account for uncertainty. For example, the predicting device may estimate the interruption duration to be for three seconds, but may set the time period duration to five seconds (e.g., a time buffer of two seconds) to account for uncertainty, for example, in the size of the obstruction and/or the speed of travel of the UE.

In some examples, the time period duration may correspond to the interruption duration associated with the blockage of LOS propagation. For example, the time period may indicate the duration as a time window for a future time (e.g., the starting time of the predicted interruption may be offset from a current time). For example, the time period may indicate a duration of five seconds corresponding to the interruption duration and a starting time of ten seconds from the current time. In some examples, the time period duration may indicate a duration starting from the current time. For example, the time period duration may include a duration of 15 seconds including five seconds corresponding to the interruption duration and an offset of ten seconds from the current time corresponding to when the communication link is expected to experience the predicted interruption.

The network entity and the UE may then perform actions to mitigate or lessen the impact (e.g., disruption in the communication link) of the predicted interruption. For example, the network entity may pause or refrain from scheduling communications (e.g., uplink transmissions and/or downlink transmissions) with the UE for the time period associated with the interruption duration. Additionally, or alternatively, the UE may hold off (e.g., refrain from) performing one or more procedures that may be associated with correcting an interruption in a communication link for the indicated time period, such as declaring radio link failure (RLF), releasing a radio resource control (RRC) connection, performing a new satellite search procedure, performing beam steering, etc. The network entity and the UE may perform the actions for the time period duration starting at a current time or a future time.

Particular aspects of the subject matter described in this disclosure can be implemented to improve communication performance. For example, satellite-based communications may provide service coverage to areas where a terrestrial network may be unable to provide service coverage, such as rural areas. By predicting an interruption, aspects disclosed herein may improve communication performance by taking actions to mitigate the impact on satellite-based communications due to the interruption. More specifically, the UE and the network entity may operate as if there is no traffic scheduled during the time period associated with the interruption. As a result, the UE may refrain from performing one or more communication link correction procedures that may increase signaling overhead and, thus, may introduce delays in communications. Additionally, for the indicated time period associated with the interruption duration, the network entity may refrain from scheduling communications with the UE that may increase signaling overhead and, thus, may introduce delays in communications. By avoiding performing the one or more communication link correction procedures due to an obstruction that blocks LOS propagation and avoiding scheduling communications for the time period associated with the interruption duration, the aspects disclosed herein may achieve increased connectivity while improving spectral efficiency.

Although the following description provides examples directed to 5G NR, the concepts described herein may be applicable to other similar areas, such as 6G, 5G-advanced, LTE, LTE-A, CDMA, GSM, and/or other wireless technologies.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (e.g., an EPC 160), and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., SI interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

In some aspects, a base station (e.g., one of the base stations 102 or one of base stations 180) may be referred to as a RAN and may include aggregated or disaggregated components. As an example of a disaggregated RAN, a base station may include a central unit (CU) (e.g., a CU 106), one or more distributed units (DU) (e.g., a DU 105), and/or one or more remote units (RU) (e.g., an RU 109), as illustrated in FIG. 1. A RAN may be disaggregated with a split between the RU 109 and an aggregated CU/DU. A RAN may be disaggregated with a split between the CU 106, the DU 105, and the RU 109. A RAN may be disaggregated with a split between the CU 106 and an aggregated DU/RU. The CU 106 and the one or more DUs may be connected via an F1 interface. A DU 105 and an RU 109 may be connected via a fronthaul interface. A connection between the CU 106 and a DU 105 may be referred to as a midhaul, and a connection between a DU 105 and the RU 109 may be referred to as a fronthaul. The connection between the CU 106 and the core network 190 may be referred to as the backhaul.

The RAN may be based on a functional split between various components of the RAN, e.g., between the CU 106, the DU 105, or the RU 109. The CU 106 may be configured to perform one or more aspects of a wireless communication protocol, e.g., handling one or more layers of a protocol stack, and the one or more DUs may be configured to handle other aspects of the wireless communication protocol, e.g., other layers of the protocol stack. In different implementations, the split between the layers handled by the CU and the layers handled by the DU may occur at different layers of a protocol stack. As one, non-limiting example, a DU 105 may provide a logical node to host a radio link control (RLC) layer, a medium access control (MAC) layer, and at least a portion of a physical (PHY) layer based on the functional split. An RU may provide a logical node configured to host at least a portion of the PHY layer and radio frequency (RF) processing. The CU 106 may host higher layer functions, e.g., above the RLC layer, such as a service data adaptation protocol (SDAP) layer, a packet data convergence protocol (PDCP) layer, and/or an upper layer. In other implementations, the split between the layer functions provided by the CU, the DU, or the RU may be different.

The base stations 102 may wirelessly communicate with the UEs 104. Each of the base stations 102 may provide communication coverage for a respective geographic coverage area 110. There may be overlapping geographic coverage areas. For example, a small cell 103 may have a coverage area 111 that overlaps the respective geographic coverage area 110 of one or more base stations (e.g., one or more macro base stations, such as the base stations 102). A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE to a base station and/or downlink (DL) (also referred to as forward link) transmissions from a base station to a UE. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs may communicate with each other using device-to-device (D2D) communication links, such as a D2D communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP), such as an AP 150, in communication with Wi-Fi stations (STAs), such as STAs 152, via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 103 may operate in a licensed and/or an unlicensed frequency spectrum. When operating in an unlicensed frequency spectrum, the small cell 103 may employ NR and use the same unlicensed frequency spectrum (e.g., 5 GHZ, or the like) as used by the Wi-Fi AP 150. The small cell 103, employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHZ), FR4 (71 GHz-114.25 GHZ), and FR5

(114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHZ, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

A base station, whether a small cell 103 or a large cell (e.g., a macro base station), may include and/or be referred to as an eNB, gNodeB (gNB), or another type of base station. Some base stations, such as a gNB, may operate in a traditional sub 6 GHz spectrum, in millimeter wave frequencies, and/or near millimeter wave frequencies in communication with the UEs 104. When the gNB operates in millimeter wave or near millimeter wave frequencies, the base stations 180 may be referred to as a millimeter wave base station. A millimeter wave base station may utilize beamforming 181 with the UEs 104 to compensate for the path loss and short range. The base stations 180 and the UEs 104 may each include a plurality of antennas, such as antenna elements, antenna panels, and/or antenna arrays to facilitate the beamforming.

The base stations 180 may transmit a beamformed signal to the UEs 104 in one or more transmit directions 182. The UEs 104 may receive the beamformed signal from the base stations 180 in one or more receive directions 183. The UEs 104 may also transmit a beamformed signal to the base stations 180 in one or more transmit directions. The base stations 180 may receive the beamformed signal from the UEs 104 in one or more receive directions. The base stations 180/UEs 104 may perform beam training to determine the best receive and transmit directions for each of the base stations 180/UEs 104. The transmit and receive directions for the base stations 180 may or may not be the same. The transmit and receive directions for the UEs 104 may or may not be the same.

The EPC 160 may include a Mobility Management Entity (e.g., an MME 162), other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway (e.g., a PDN Gateway 172). The MME 162 may be in communication with a Home Subscriber Server (HSS) (e.g., an HSS 174). The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) (e.g., an AMF 192), other AMFs 193, a Session Management Function (SMF) 194, and a User Plane Function (UPF) (e.g., a UPF 195). The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base stations 102 may include and/or be referred to as a gNB, Node B, eNB, an access point, a base transceiver station, a radio base station, a radio transceiver, a transceiver function, a basic service set (BSS), an extended service set (ESS), a transmission reception point (TRP), network node, network entity, network equipment, or some other suitable terminology. The base stations 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN). The base stations 102 provide an access point to the EPC 160 or core network 190 for the UEs 104.

Examples of UEs include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs may be referred to as IoT devices (e.g., parking meter, gas pump, toaster, vehicles, heart monitor, etc.). The UEs may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, a device in communication with a network entity, such as one of the UEs 104 in communication with one of the base stations 102 or a component of a base station (e.g., a CU 106, a DU 105, and/or an RU 109), may be configured to manage one or more aspects of wireless communication. For example, the UEs 104 may have a UE interruption handling component 198 that may be configured to facilitate handling of an interruption in a satellite-based communication link due to blockage of LOS propagation. In certain aspects, the UE interruption handling component 198 may be configured to determine an interruption for a satellite-based communication link based in part on UE location information and blockage information of an obstruction that blocks LOS propagation for the satellite-based communication link. The example UE interruption handling component 198 may also be configured to refrain performance of one or more communication link correction procedures for a time period associated with the interruption.

In another configuration, a network entity, such as a satellite 107, one of the base stations 102, or a component of a base station (e.g., a CU 106, a DU 105, and/or an RU 109), may be configured to manage or more aspects of wireless communication. For example, one of the base stations 102 or the satellite 107 may have an NW interruption handling component 199 that may be configured to facilitate handling of an interruption in a satellite-based communication link due to blockage of LOS propagation. In certain aspects, the NW interruption handling component 199 may be configured to determine an interruption for a satellite-based communication link with a UE based in part on UE location information and blockage information of an obstruction that blocks LOS propagation for the satellite-based communication link. The example NW interruption handling component 199 may also be configured to refrain scheduling of communications with the UE for a time period associated with the interruption.

Aspects disclosed herein facilitate a UE and/or a network entity to predict an occurrence of an interruption in a communication link due to a blockage of LOS propagation between the UE and a satellite facilitating satellite-based communication for the UE. In some aspects, based on the predicted interruption, the UE and the network entity may refrain from performing at least one procedure to mitigate the impact of the interruption in the communication link.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a TRP, or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 2:
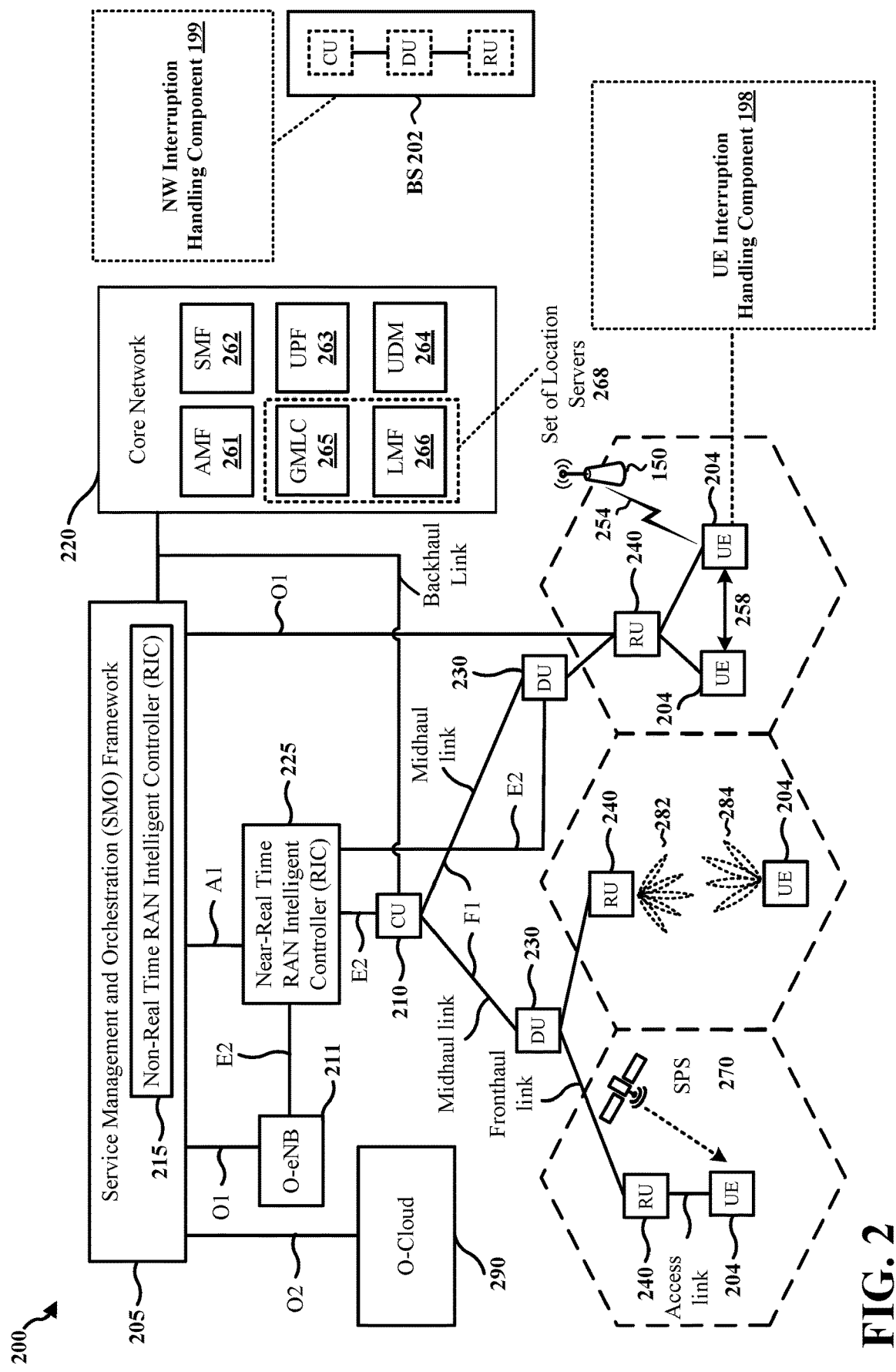
FIG. 2 shows a diagram illustrating architecture of an example of a disaggregated base station.

As an example, FIG. 2 shows a diagram illustrating architecture of an example of a disaggregated base station 200. The architecture of the disaggregated base station 200 may include one or more CUs (e.g., a CU 210) that can communicate directly with a core network 220 via a backhaul link, or indirectly with the core network 220 through one or more disaggregated base station units (such as a Near-Real Time (Near-RT) RAN Intelligent Controller (RIC) (e.g., a Near-RT RIC 225) via an E2 link, or a Non-Real Time (Non-RT) RIC 215 associated with a Service Management and Orchestration (SMO) Framework (e.g., an SMO Framework 205), or both). A CU 210 may communicate with one or more DUs (e.g., a DU 230) via respective midhaul links, such as an F1 interface. The DU 230 may communicate with one or more RUs (e.g., an RU 240) via respective fronthaul links. The RU 240 may communicate with respective UEs (e.g., a UE 204) via one or more radio frequency (RF) access links. In some implementations, the UE 204 may be simultaneously served by multiple RUs.

Each of the units, i.e., the CUS (e.g., a CU 210), the DUs (e.g., a DU 230), the RUs (e.g., an RU 240), as well as the Near-RT RICs (e.g., the Near-RT RIC 225), the Non-RT RICs (e.g., the Non-RT RIC 215), and the SMO Framework 205, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (i.e., Central Unit—User Plane (CU-UP)), control plane functionality (i.e., Central Unit—Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as an E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU 240 can be implemented to handle over the air (OTA) communication with one or more UEs (e.g., the UE 204). In some implementations, real-time and non-real-time aspects of control and user plane communication with the RU 240 can be controlled by a corresponding DU. In some scenarios, this configuration can enable the DU(s) and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements that may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs, DUs, RUS and Near-RT RICs. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs, one or more DUs, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via 01) or via creation of RAN management policies (such as A1 policies).

At least one of the CU 210, the DU 230, and the RU 240 may be referred to as a base station 202. Accordingly, a base station 202 may include one or more of the CU 210, the DU 230, and the RU 240 (each component indicated with dotted lines to signify that each component may or may not be included in the base station 202). The base station 202 provides an access point to the core network 220 for a UE 204. The communication links between the RUs (e.g., the RU 240) and the UEs (e.g., the UE 204) may include uplink (UL) (also referred to as reverse link) transmissions from a UE 204 to an RU 240 and/or downlink (DL) (also referred to as forward link) transmissions from an RU 240 to a UE 204.

Certain UEs may communicate with each other using D2D communication (e.g., a D2D communication link 258). The D2D communication link 258 may use the DL/UL WWAN spectrum. The D2D communication link 258 may use one or more sidelink channels. D2D communication may be through a variety of wireless D2D communications systems, such as for example, Bluetooth, Wi-Fi based on the IEEE 802.11 standard, LTE, or NR.

The wireless communications system may further include a Wi-Fi AP 250 in communication with a UE 204 (also referred to as Wi-Fi STAs) via communication link 254, e.g., in a 5 GHz unlicensed frequency spectrum or the like. When communicating in an unlicensed frequency spectrum, the UE 204/Wi-Fi AP 250 may perform a CCA prior to communicating in order to determine whether the channel is available.

The base station 202 and the UE 204 may each include a plurality of antennas, such as antenna elements, antenna panels, and/or antenna arrays to facilitate beamforming. The base station 202 may transmit a beamformed signal 282 to the UE 204 in one or more transmit directions. The UE 204 may receive the beamformed signal from the base station 202 in one or more receive directions. The UE 204 may also transmit a beamformed signal 284 to the base station 202 in one or more transmit directions. The base station 202 may receive the beamformed signal from the UE 204 in one or more receive directions. The base station 202/UE 204 may perform beam training to determine the best receive and transmit directions for each of the base station 202/UE 204. The transmit and receive directions for the base station 202 may or may not be the same. The transmit and receive directions for the UE 204 may or may not be the same.

The core network 220 may include an Access and Mobility Management Function (AMF) (e.g., an AMF 261), a Session Management Function (SMF) (e.g., an SMF 262), a User Plane Function (UPF) (e.g., a UPF 263), a Unified Data Management (UDM) (e.g., a UDM 264), one or more location servers 268, and other functional entities. The AMF 261 is the control node that processes the signaling between the UE 204 and the core network 220. The AMF 261 supports registration management, connection management, mobility management, and other functions. The SMF 262 supports session management and other functions. The UPF 263 supports packet routing, packet forwarding, and other functions. The UDM 264 supports the generation of authentication and key agreement (AKA) credentials, user identification handling, access authorization, and subscription management. The one or more location servers 268 are illustrated as including a Gateway Mobile Location Center (GMLC) (e.g., a GMLC 265) and a Location Management Function (LMF) (e.g., an LMF 266). However, generally, the one or more location servers 268 may include one or more location/positioning servers, which may include one or more of the GMLC 265, the LMF 266, a position determination entity (PDE), a serving mobile location center (SMLC), a mobile positioning center (MPC), or the like. The GMLC 265 and the LMF 266 support UE location services. The GMLC 265 provides an interface for clients/applications (e.g., emergency services) for accessing UE positioning information. The LMF 266 receives measurements and assistance information from the NG-RAN and the UE 204 via the AMF 261 to compute the position of the UE 204. The NG-RAN may utilize one or more positioning methods in order to determine the position of the UE 204. Positioning the UE 204 may involve signal measurements, a position estimate, and an optional velocity computation based on the measurements. The signal measurements may be made by the UE 204 and/or the base station 202 serving the UE 204. The signals measured may be based on one or more of a satellite positioning system (SPS) 270 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

A wireless device, such as the UE 204, may include the UE interruption handling component 198 that may be configured to facilitate handling of an interruption in a satellite-based communication link due to blockage of LOS propagation, as described in connection with the example of FIG. 1.

In certain aspects, a base station, such as the disaggregated base station 200, or a component of the base station, may include the NW interruption handling component 199 that may be configured to facilitate handling of an interruption in a satellite-based communication link due to blockage of LOS propagation, as described in connection with the example of FIG. 1.

Figure 3:
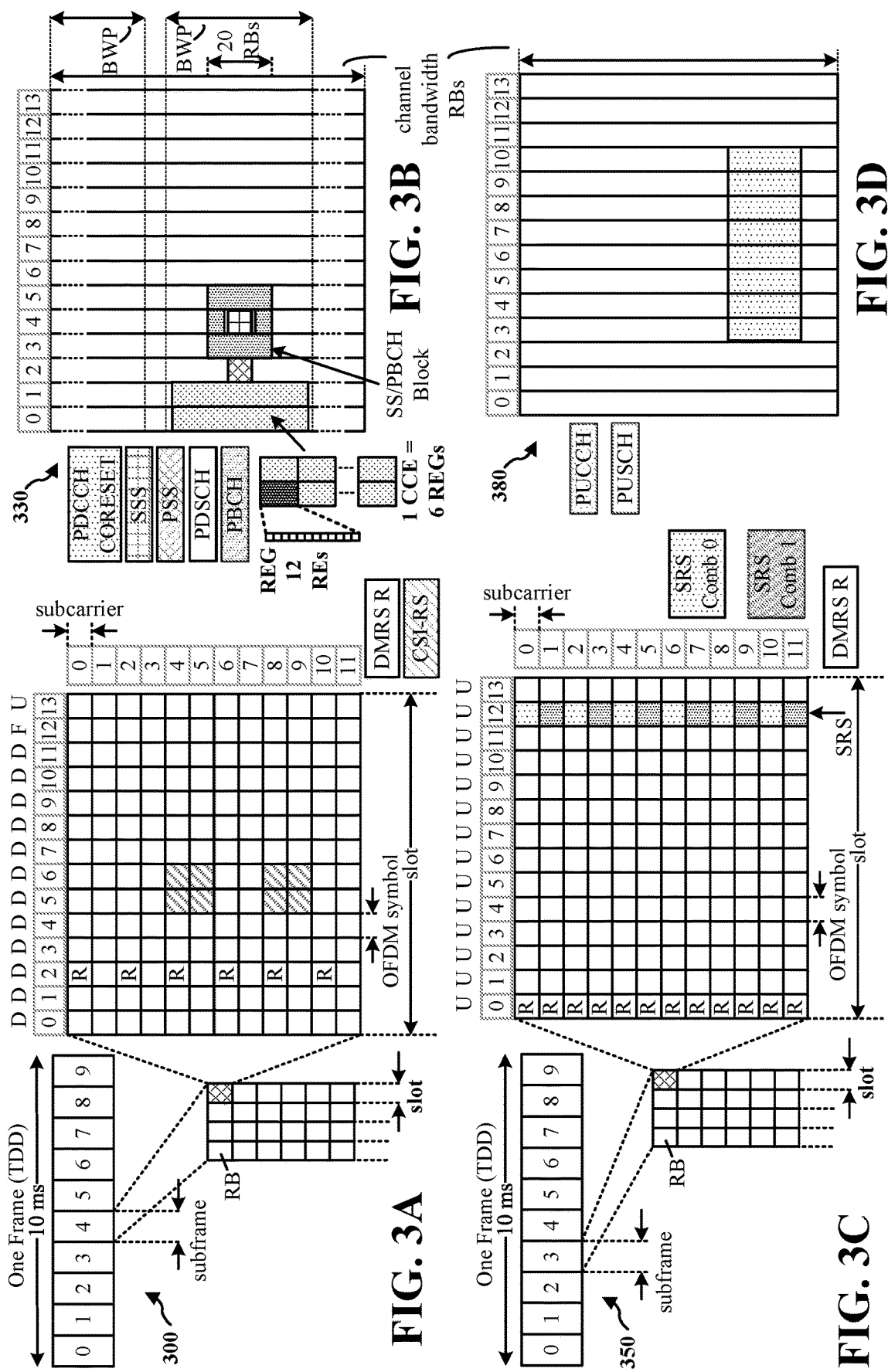
FIG. 3A is a diagram illustrating an example of a first subframe within a 5G NR frame structure.
FIG. 3B is a diagram illustrating an example of DL channels within a 5G NR subframe.
FIG. 3C is a diagram illustrating an example of a second subframe within a 5G NR frame structure.
FIG. 3D is a diagram illustrating an example of UL channels within a 5G NR subframe.

FIG. 3A is a diagram 300 illustrating an example of a first subframe within a 5G NR frame structure. FIG. 3B is a diagram 330 illustrating an example of DL channels within a 5G NR subframe. FIG. 3C is a diagram 350 illustrating an example of a second subframe within a 5G NR frame structure. FIG. 3D is a diagram 380 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 3A, 3C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 3A-3D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| $\mu$ | SCS $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$0 to 4 allow for 1, 2, 4, 8, and 16 slots, respectively, per subframe. For extended CP, the numerology 2 allows for 4 slots per subframe. Accordingly, for normal CP and numerology u, there are 14 symbols/slot and $2^\mu$ slots/subframe. As shown in Table 1, the subcarrier spacing may be equal to $2^\mu*15$ kHz, where u is the numerology 0 to 4. As such, the numerology $\mu$=0 has a subcarrier spacing of 15 kHz and the numerology $\mu$=4 has a subcarrier spacing of 240 kHz. The symbol length/duration is inversely related to the subcarrier spacing. FIGS. 3A-3D provide an example of normal CP with 14 symbols per slot and numerology $\mu$=2 with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 3B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 4:
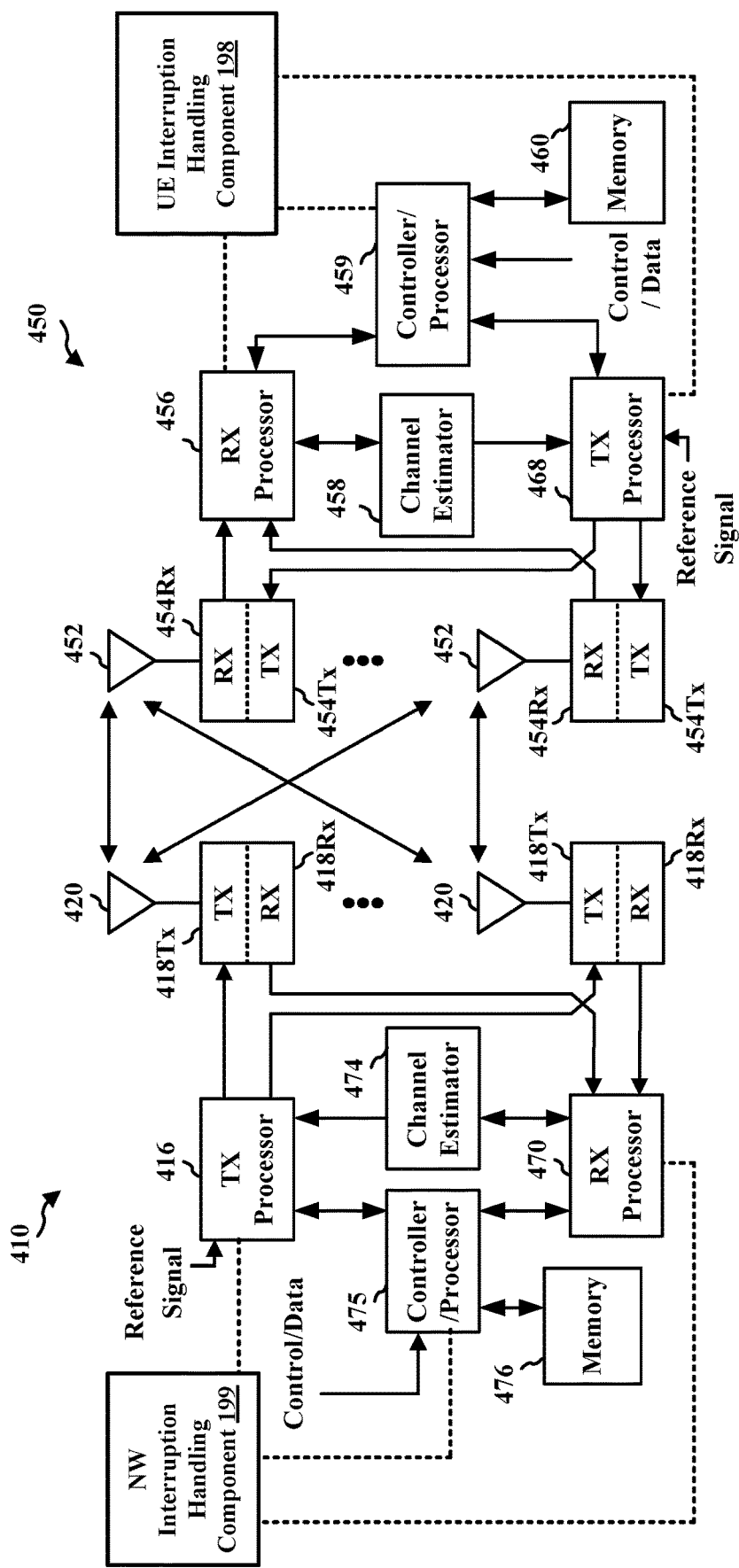
FIG. 4 is a block diagram that illustrates an example of a first wireless device that is configured to exchange wireless communication with a second wireless device.

FIG. 4 is a block diagram that illustrates an example of a first wireless device that is configured to exchange wireless communication with a second wireless device. In the illustrated example of FIG. 4, the first wireless device may include a base station 410, the second wireless device may include a UE 450, and the base station 410 may be in communication with the UE 450 in an access network. As shown in FIG. 4, the base station 410 includes a transmit processor (TX processor 416), a transmitter 418Tx, a receiver 418Rx, antennas 420, a receive processor (RX processor 470), a channel estimator 474, a controller/processor 475, and memory 476. The example UE 450 includes antennas 452, a transmitter 454Tx, a receiver 454Rx, an RX processor 456, a channel estimator 458, a controller/processor 459, memory 460, and a TX processor 468. In other examples, the base station 410 and/or the UE 450 may include additional or alternative components.

In the DL, Internet protocol (IP) packets may be provided to the controller/processor 475. The controller/processor 475 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 475 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The TX processor 416 and the RX processor 470 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 416 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from the channel estimator 474 may be used to determine the coding and modulation scheme, as well as for spatial processing. The channel estimate may be derived from a reference signal and/or channel condition feedback transmitted by the UE 450. Each spatial stream may then be provided to a different antenna of the antennas 420 via a separate transmitter (e.g., the transmitter 418Tx). Each transmitter 418Tx may modulate a radio frequency (RF) carrier with a respective spatial stream for transmission.

At the UE 450, each receiver 454Rx receives a signal through its respective antenna of the antennas 452. Each receiver 454Rx recovers information modulated onto an RF carrier and provides the information to the RX processor 456. The TX processor 468 and the RX processor 456 implement layer 1 functionality associated with various signal processing functions. The RX processor 456 may perform spatial processing on the information to recover any spatial streams destined for the UE 450. If multiple spatial streams are destined for the UE 450, two or more of the multiple spatial streams may be combined by the RX processor 456 into a single OFDM symbol stream. The RX processor 456 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 410. These soft decisions may be based on channel estimates computed by the channel estimator 458. The soft decisions are then decoded and deinterleaved to recover the data and control signals that were originally transmitted by the base station 410 on the physical channel. The data and control signals are then provided to the controller/processor 459, which implements layer 3 and layer 2 functionality.

The controller/processor 459 can be associated with the memory 460 that stores program codes and data. The memory 460 may be referred to as a computer-readable medium. In the UL, the controller/processor 459 provides demultiplexing between transport and logical channels, packet reassembly, deciphering, header decompression, and control signal processing to recover IP packets. The controller/processor 459 is also responsible for error detection using an ACK and/or NACK protocol to support HARQ operations.

Similar to the functionality described in connection with the DL transmission by the base station 410, the controller/processor 459 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization. Channel estimates derived by the channel estimator 458 from a reference signal or feedback transmitted by the base station 410 may be used by the TX processor 468 to select the appropriate coding and modulation schemes, and to facilitate spatial processing. The spatial streams generated by the TX processor 468 may be provided to different antenna of the antennas 452 via separate transmitters (e.g., the transmitter 454Tx). Each transmitter 454Tx may modulate an RF carrier with a respective spatial stream for transmission.

The UL transmission is processed at the base station 410 in a manner similar to that described in connection with the receiver function at the UE 450. Each receiver 418Rx receives a signal through its respective antenna of the antennas 420. Each receiver 418Rx recovers information modulated onto an RF carrier and provides the information to the RX processor 470.

The controller/processor 475 can be associated with the memory 476 that stores program codes and data. The memory 476 may be referred to as a computer-readable medium. In the UL, the controller/processor 475 provides demultiplexing between transport and logical channels, packet reassembly, deciphering, header decompression, control signal processing to recover IP packets. The controller/processor 475 is also responsible for error detection using an ACK and/or NACK protocol to support HARQ operations.

At least one of the TX processor 468, the RX processor 456, and the controller/processor 459 may be configured to perform aspects in connection with the UE interruption handling component 198 of FIG. 1.

At least one of the TX processor 416, the RX processor 470, and the controller/processor 475 may be configured to perform aspects in connection with the NW interruption handling component 199 of FIG. 1.

Figure 5:
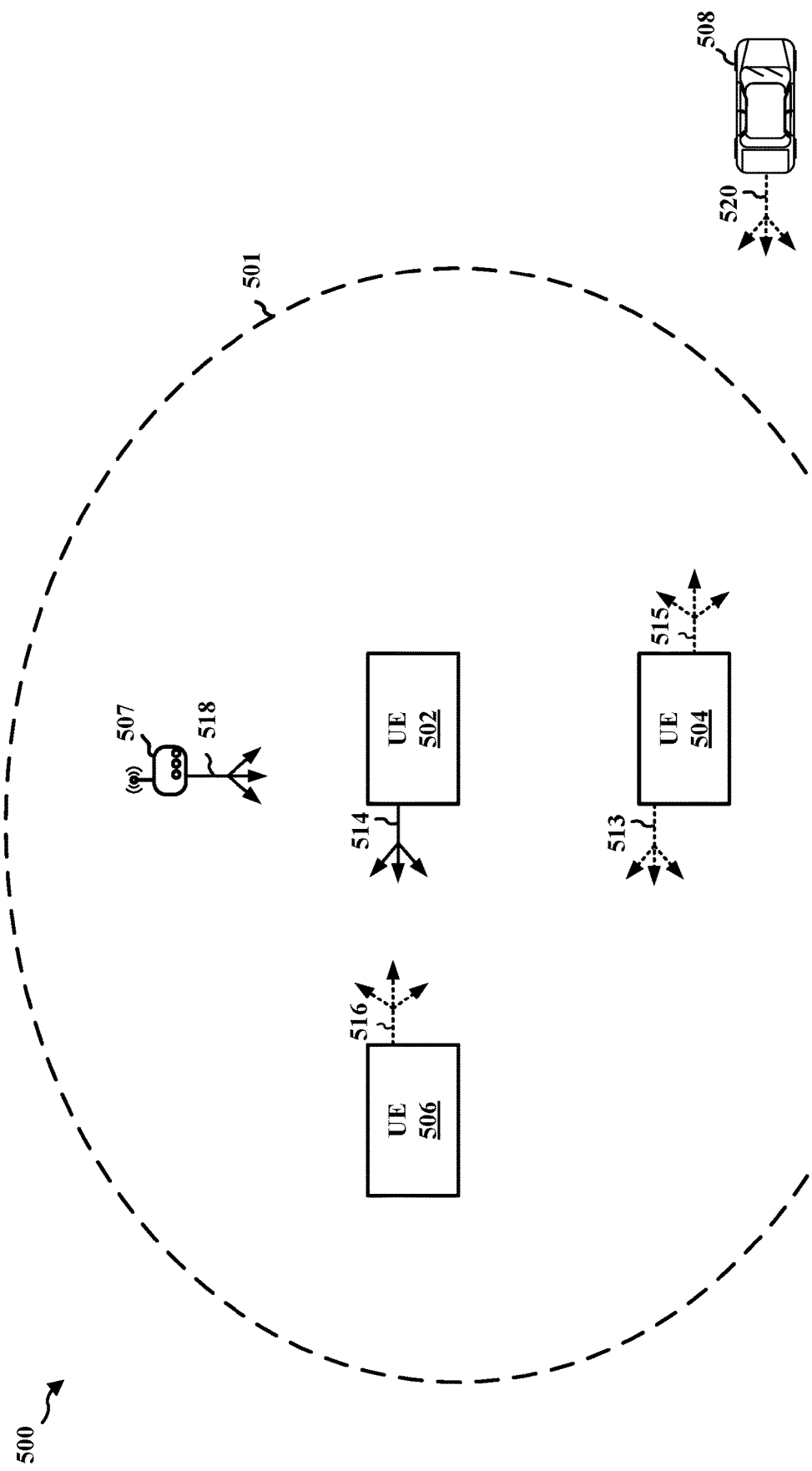
FIG. 5 illustrates an example of communication between devices, in accordance with the teachings disclosed herein.

FIG. 5 illustrates an example 500 of communication between devices, as presented herein. For example, a first UE 502 may transmit a communication 514 that may be received by a second UE 504, a third UE 506, and/or a fourth UE 508. In some examples, the communication 514 may be received directly from the first UE 502, e.g., without being transmitting through a base station. Additionally, or alternatively, an RSU 507 may receive communication from and/or transmit communication to the first UE 502, the second UE 504, the third UE 506, and/or the fourth UE 508. As shown in FIG. 5, the RSU 507 may transmit a communication 518 that is received directly from the RSU 507.

The first UE 502, the second UE 504, the third UE 506, the fourth UE 508, and/or the RSU 507 may each be capable of operating as a transmitting device in addition to operating as a receiving device. Thus, the second UE 504 is illustrated as transmitting a second communication 513 and a third communication 515, the third UE 506 is illustrated as transmitting a fourth communication 516, and the fourth UE 508 is illustrated as transmitting a fifth communication 520. One or more of the communications may be broadcast or multicast to nearby devices. For example, the first UE 502 may transmit communications intended for receipt by other UEs within a range 501 of the first UE 502. In other examples, one or more of the communications may be groupcast to nearby devices that are a member of a group. In other examples, one or more of the communications may be unicast from one UE to another UE.

Figure 6:
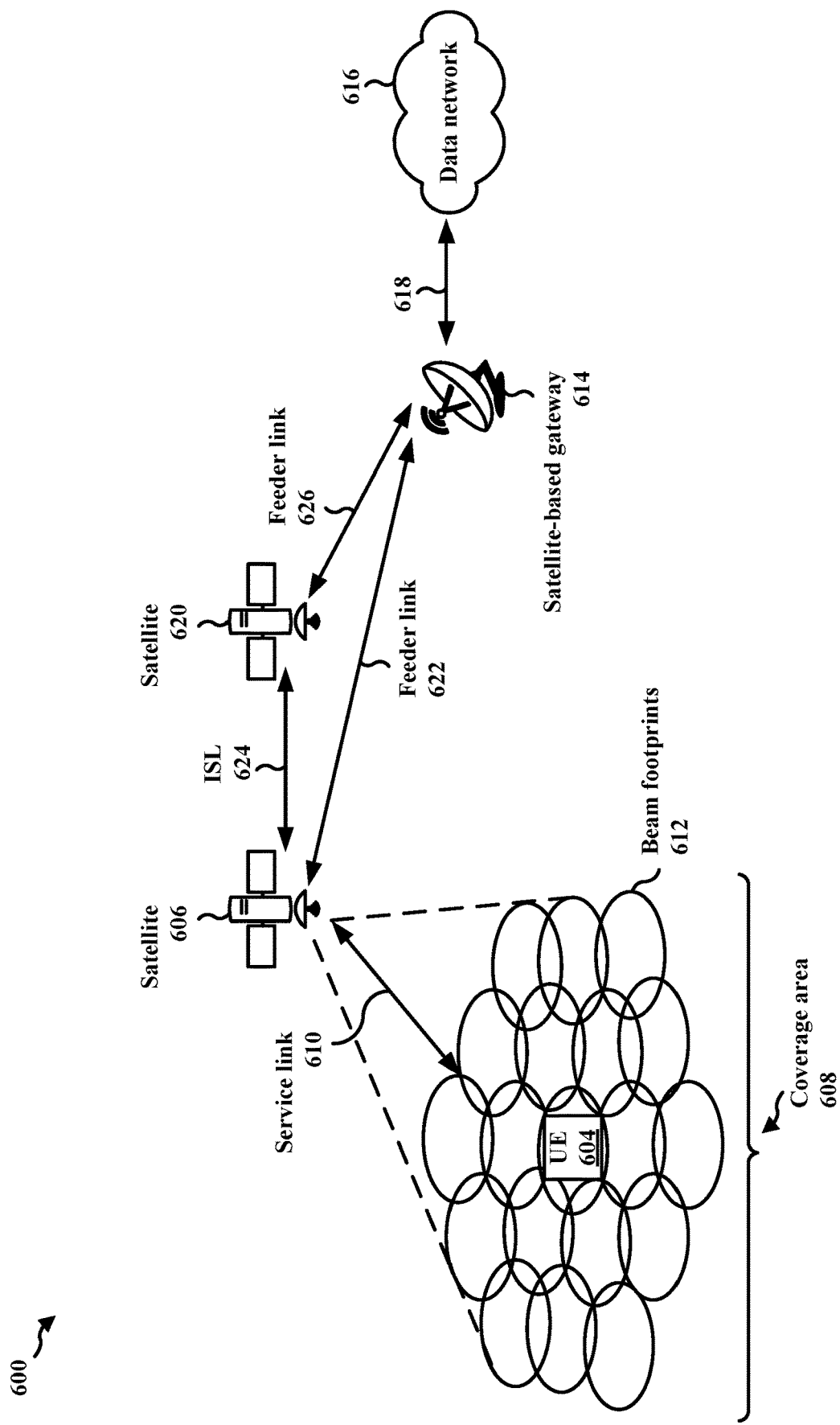
FIG. 6 is a diagram illustrating an example environment that may support satellite-based communication to a UE, in accordance with the teachings disclosed herein.

FIG. 6 is a diagram illustrating an example environment 600 that may support satellite-based communication for a UE 604, as presented herein. In the illustrated example of FIG. 6, the UE 604 may transmit or receive satellite-based communication (e.g., via a satellite-based 3GPP NTN or a private satellite communication system). For example, a first satellite 606 may provide coverage to the UE 604 located within a coverage area 608 of the first satellite 606. In some aspects, the coverage area 608 may represent the field of view of the first satellite 606.

In the illustrated example of FIG. 6, the first satellite 606 communicates with the UE 604 via a service link 610. The service link 610 may include a radio link that provides wireless communication between the UE 604 and the first satellite 606.

The first satellite 606 may radiate different beams. Additionally each of the different beams may be associated with respective footprints (e.g., beam footprints 612) that have boundaries at the terrestrial-level (e.g., at the surface of Earth). As such, the UE 604 may receive a signal, via the service link 610, from one beam of the first satellite 606 while located within the footprint of the respective beam.

In the illustrated example of FIG. 6, a satellite-based gateway 614 connects the UE 604 to a data network 616 via a communication link 618. The satellite-based gateway 614 may include an earth station or a gateway that is located at the surface of Earth. The satellite-based gateway 614 may provide sufficient RF power and RF sensitivity for accessing a satellite, such as the first satellite 606 and/or a second satellite 620. The satellite-based gateway 614 may be a transport network layer (TNL) node.

In some aspects, the first satellite 606 may be configured to communicate directly with the satellite-based gateway 614 via a first feeder link 622. The first feeder link 622 may include a radio link that provides wireless communication between the first satellite 606 and the satellite-based gateway 614.

In other aspects, the first satellite 606 may communicate with the satellite-based gateway 614 via one or more other satellites. For example, the first satellite 606 and the second satellite 620 may be part of a constellation of satellites that communicate via inter-satellite links (ISLs). In the example of FIG. 6, the first satellite 606 may establish an ISL 624 with the second satellite 620. The ISL 624 may be a radio interface or an optical interface and operate in the RF frequency or optical bands, respectively. The second satellite 620 may communicate with the satellite-based gateway 614 via a second feeder link 626.

In the illustrated example of FIG. 6, the first satellite 606 and/or the second satellite 620 may include an aerial device, such as a UAS platform, a balloon, a drone, a UAV, etc. Examples of a satellite that may be used for satellite-based communication include a space-borne vehicle placed into Low-Earth Orbit (LEO), Medium-Earth Orbit (MEO), Geostationary Earth Orbit (GEO), or High Elliptical Orbit (HEO). Examples of a UAS platform that may be used for satellite-based communication include systems including Tethered UAS (TUA), Lighter Than Air UAS (LTA), Heavier Than Air UAS (HTA), and High Altitude Platforms (HAPs).

In some aspects, the first satellite 606 and/or the second satellite 620 may implement a transparent payload (sometimes referred to as a "bent pipe" payload). For example, after receiving a signal, a transparent satellite may have the ability to change the frequency carrier of the signal, perform RF filtering on the signal, and amplify the signal before outputting the signal. In such aspects, the signal output by the transparent satellite may be a repeated signal in which the waveform of the output signal is unchanged relative to the received signal.

In other aspects, the first satellite 606 and/or the second satellite 620 may implement a regenerative payload. For example, a regenerative satellite may have the ability to perform all of or part of the base station functions, such as transforming and amplifying a received signal via on-board processing before outputting a signal. In some such aspects, transformation of the received signal may refer to digital processing that may include demodulation, decoding, switching and/or routing, re-encoding, re-modulation, and/or filtering of the received signal.

In examples in which the satellite implements a transparent payload, the transparent satellite may communicate with an on-ground base station via the satellite-based gateway 614. In some such examples, the on-ground base station may facilitate communication between the satellite-based gateway 614 and the data network 616. In examples in which the satellite implements a regenerative payload, the regenerative satellite may have an on-board base station. In some such examples, the on-board base station may communicate with the data network 616 via the satellite-based gateway 614. In some examples, the on-board base station may include a DU and a CU, such as the DU 105 and the CU 106 of FIG. 1. In some examples, the on-board base station may include a DU that is in communication with a corresponding CU that is on the ground.

In the example of FIG. 6, the UE 604 and the satellite-based communication system maintain location information of the UE 604. For example, the first satellite 606 may maintain UE location information (e.g., location information of the UE 604, a velocity of the UE, a speed of travel of the UE, a direction of travel of the UE, etc.) to perform beam management procedures. In some examples, the satellite-based communication system may maintain the UE location information as services available to the UE 604 may be tied to the location of the UE 604. For example, a beam footprint may be large and, in some scenarios, may extend beyond a border of a country. In some such examples, it may be possible for the UE 604 to be located within a beam footprint of the first satellite 606, but outside the UE country of service. As an example, the UE 604 may be registered with a network operator of a first country. While traveling within the first country, the UE 604 may be served by a beam of the first satellite 606. At a later time, the UE 604 may travel outside the first country to a second country and a beam footprint of the beam serving the UE 604 may overlap with at least a portion of the second country. In some such examples, even though the UE 604 may be served by the same beam in the first country and the second country, the UE 604 may not be registered for services in the second country. Thus, based on the location information indicating that the UE 604 is located within the second country, the UE 604 may receive no communication services or may receive reduced communication services compared to when the UE 604 is located within the first country.

In some examples, the UE 604 and/or the satellite-based communication system may obtain the UE location information via a satellite positioning system, such as GNSS, GPS, NTN, or other satellite position/location system. In some examples, the UE 604 may position itself and report its UE location information to the satellite-based communication system. However, in other examples, other techniques for positioning the location of the UE 604 may be used.

A satellite-based wireless channel between the UE 604 and the first satellite 606 may be characterized via strong LOS propagation. In some aspects, the UE 604 may have strong LOS propagation when the UE 604 is a stationary UE (e.g., a non-moving UE or a fixed UE). In some such examples, the location of the UE 604 may be planned so that at least one antenna of the UE 604 may have an unobstructed view of the sky and, thus, strong LOS propagation between the UE 604 and the first satellite 606 may be achieved.

However, in some aspects, the UE 604 may be non-stationary, such as a connected vehicle. For example, the connected vehicle may be equipped with a roof-top antenna that facilities satellite-based communication at the connected vehicle. A non-stationary UE (e.g., a UE with the capability to be mobile), such as a connected vehicle, may experience blockage of LOS propagation. For example, the UE 604 may travel under an overpass or interexchange that may block LOS propagation of a communication link between the UE 604 and the first satellite 606. In some such aspects, the blockage of LOS propagation may cause an interruption in the connection (e.g., the communication link) between the UE and the satellite-based communication system. For example, the blockage may cause an interruption to the service link 610 between the UE 604 and the first satellite 606.

In some aspects of wireless communication, an interruption of a connection (e.g., a communication link), even a brief interruption (e.g., due to passing under an overpass), may cause decreased communication performance at the UE. For example, after a UE detects an interruption in a communication link, the UE may initiate one or more correction procedures to correct the interruption in the communication link. The performing of the one or more communication link correction procedures may be associated with signaling overhead, which may introduce delays in communication.

For example, after the UE detects an interruption in the communication link, the UE may trigger a declaration of an RLF, which may cause the UE to perform one or more procedures to re-establish the radio link (or communication link). In some aspects, after the UE detects an interruption in the communication link, the UE may release an RRC connection, which may cause the UE to perform one or more procedures (e.g., random access procedures) to establish a new RRC connection. In some aspects, after the UE detects an interruption in the communication link, the UE may perform beam steering procedures to search for a new satellite. In some aspects, after the UE detects an interruption in the communication link, the UE may perform procedures to re-establish (or re-acquire) a communication link with the satellite.

Aspects disclosed herein provide techniques for predicting an occurrence of an interruption in a communication link between a UE and a satellite, for example, due to an obstruction causing blockage of LOS propagation between the UE and the satellite. For example, disclosed techniques include using information of an obstruction (e.g., blockage information) to predict an interruption in a satellite-based communication link between the UE and the satellite. A network entity of the satellite-based communication system (e.g., the first satellite 606, the satellite-based gateway 614, an on-ground base station, an on-board base station, a component of a base station, etc.) and the UE may then exchange information regarding the predicted interruption. In some aspects disclosed herein, the network entity and the UE may perform at least one action to mitigate the impact from the predicted interruption (e.g., to lessen the disruption to the satellite-based communication based on the interruption).

Figure 7:
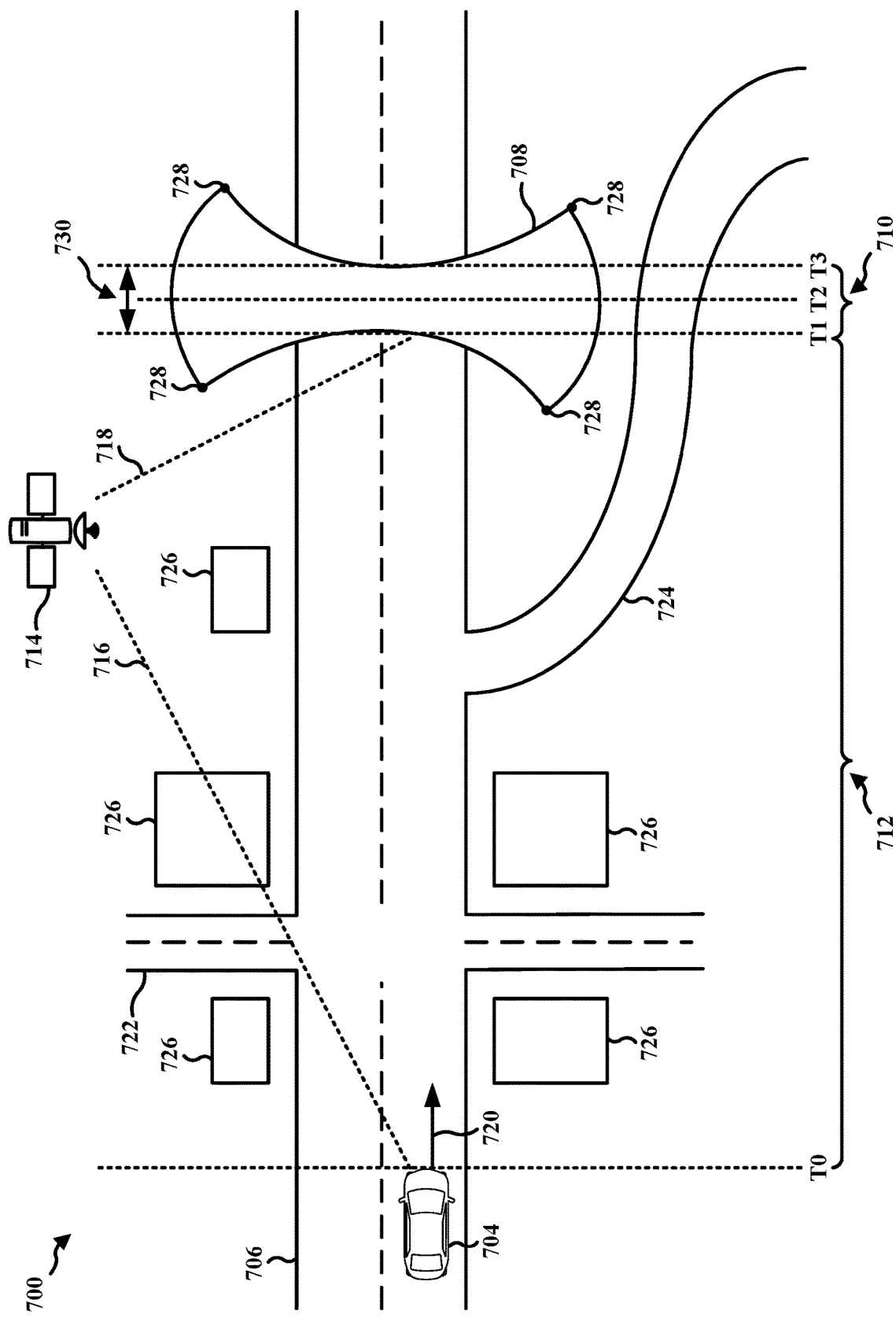
FIG. 7 illustrates a portion of a digital map, in accordance with the teachings disclosed herein.

FIG. 7 illustrates a portion of a digital map 700, as presented herein. The digital map 700 is a graphical representation of a region that is stored in a digital format. The digital map 700 may include topology information of the region and/or location information of landmarks, such as roads, bridges, overpasses, exits, etc.

In the illustrated example of FIG. 7, the digital map 700 includes an indication of a UE 704. The UE 704 may correspond to a connected vehicle that is moving and that may experience service interruption due to a blockage of LOS propagation that is predictable. For example, the UE 704 may include an automobile (as shown in FIG. 7), a train, a boat, etc. that may travel under an obstruction with a known location, such as an overpass, an interexchange, a bridge, etc. In the orientation of the illustrated example of FIG. 7, the UE 704 is traveling in a direction 720 from left to right. A path of the UE 704 may be based on location information of the UE 704 that is mapped to the digital map 700. For example, based on the location information of the UE 704 and the direction 720, a path of the UE 704 may be mapped, via the digital map 700, to a first road 706.

The example digital map 700 also includes indications of landmarks, such as an indication of the first road 706, an indication of an obstruction 708, an indication of a second road 722, an indication of an exit 724, and indications of buildings 726. In the illustrated example of FIG. 7, the obstruction 708 includes an overpass. The digital map 700 may include location information associated with the landmarks (e.g., the first road 706, the obstruction 708, the second road 722, the exit 724, and the buildings 726). The location information may include coordinates and size information. For example, the location information for the obstruction 708 may include geo-coordinates 728 providing location and dimensions of the obstruction 708. The location information for the obstruction 708 may also include size information 730 corresponding to dimensions of the obstruction 708 that may block LOS propagation.

In the example of FIG. 7, the obstruction 708 may correspond to an obstruction that may block LOS between the UE 704 and a satellite 714, such as the first satellite 606 of FIG. 6. For example, at a time T0, the UE 704 may be located at a first location and a first signal 716 may travel directly (e.g., without reflecting off an object) between the UE 704 and the satellite 714. The first signal 716 may be communicated via a communication link between the UE 704 and the satellite 714, such as the service link 610 of FIG. 6. However, at a time T2, the UE 704 may be located at a second location that is under the obstruction 708. In such scenarios, a second signal 718 between the UE 704 and the satellite 714 may be blocked by the obstruction 708. That is, while the UE 704 is traveling under the obstruction 708, the obstruction 708 may interrupt the communication link between the UE 704 and the satellite 714.

The digital map 700 may be accessed by the UE 704 and/or by the satellite 714. In some examples, the digital map 700 may be stored at the UE 704 and/or the satellite 714. In some examples, the digital map 700 may be stored on a server that is accessible to the UE 704 and/or the satellite 714. The server may be operated by a network operator or a third party. In some examples, the digital map 700 may be updated periodically, aperiodically, or as a one-time event. For example, when the digital map 700 is stored locally at the UE 704 and/or the satellite 714, an operator may periodically provide an update to the digital map 700 with one or more changes. For example, a first iteration of a digital map may include the landmarks of the digital map 700 of FIG. 7, and a second iteration of the digital map may include a new road.

As described above, a predicting device may predict the occurrence of an interruption in a communication link based on an obstruction. For example, the UE 704 or a network entity (e.g., the satellite 714) may be configured to predict an interruption due to blockage of LOS propagation caused by the obstruction 708. The predicting device may use location information of the UE 704 (e.g., UE location information, velocity information of the UE 704, speed information of the UE 704, etc.) and blockage information of the obstruction 708 (e.g., location information, size information, etc.) to predict the interruption. In some examples, the predicting device may also use information about the satellite (e.g., location information, mobility information, etc.) to predict the interruption.

In some examples, the predicting device may predict an interruption duration associated with the predicted interruption. For example, based on the size of the obstruction 708 (e.g., the size information 730) and speed of the UE, the predicting device may predict an amount of time that the communication link between the UE 704 and the satellite 714 may be interrupted. In some examples, the speed of the UE may be known to the predicting device. For example, the UE 704 may provide UE location information that includes coordinates of the UE 704 and a current traveling speed of the UE 704. In other examples, the speed of the UE may be determined based on changes to the UE location information over time.

In the illustrated example of FIG. 7, the UE 704 is a located at the first location at the time T0. Based on the direction 720, the speed of the UE 704, and the size information 730 of the obstruction 708, the UE 704 may be predicted to travel under the obstruction 708 at a time T1, and to exit from under the obstruction 708 at a time T3. Thus, the predicting device may predict an amount of time that the communication link between the UE 704 and the satellite 714 may be interrupted based on an interruption duration 710 corresponding to a difference in the time T3 and the time T1.

To facilitate the UE 704 and the satellite 714 to mitigate the impact of the interruption, the predicting device may provide an indication of the interruption to the other device (e.g., the non-predicting device). The indication may indicate a predicted interruption in the communication link between the UE 704 and the satellite 714. In some examples, the indication may also include time information relating to the interruption. For example, the indication may include a time period duration and a starting time offset. The time period duration may correspond to an amount of time that the UE 704 and the satellite 714 may perform at least one action to mitigate the impact of the interruption. The starting time offset may indicate whether the time period duration starts at a future time (e.g., based on a non-zero value) or at a current time (e.g., based on a zero value).

In some examples, the starting time offset may indicate that the time period duration starts at a future time. For example, in the example of FIG. 7, the UE 704 may receive an indication of the predicted interruption from the satellite 714 at the time T0. The indication may include a time period duration corresponding to the interruption duration 710. The indication may also include a starting time offset indicating an amount of time before the interruption duration 710 starts based on an interval 712. In the example of FIG. 7, the interval 712 may correspond to a difference in the time T1 and the time T0. For example, the interruption duration 710 may be five seconds and the interval 712 may be ten seconds. In such scenarios, the UE 704 and the satellite 714 may wait ten seconds before performing the at least one action to mitigate the impact of the interruption in the communication link for the interruption duration 710.

In some examples, the starting time offset may indicate that the time period duration starts at the current time (e.g., when the UE 704 receives the indication of the predicted interruption from the satellite 714 at the time T0). In some such examples, the indication may include a time period duration corresponding to a difference in the time T3 and the time T0. As an example, in the above example, the time period duration may be 15 seconds based on the five seconds associated with the interruption duration 710 and the ten seconds associated with the interval 712. Additionally, the indication may include a starting time offset indicating that the start time for the time period duration is the current time.

Figure 8:
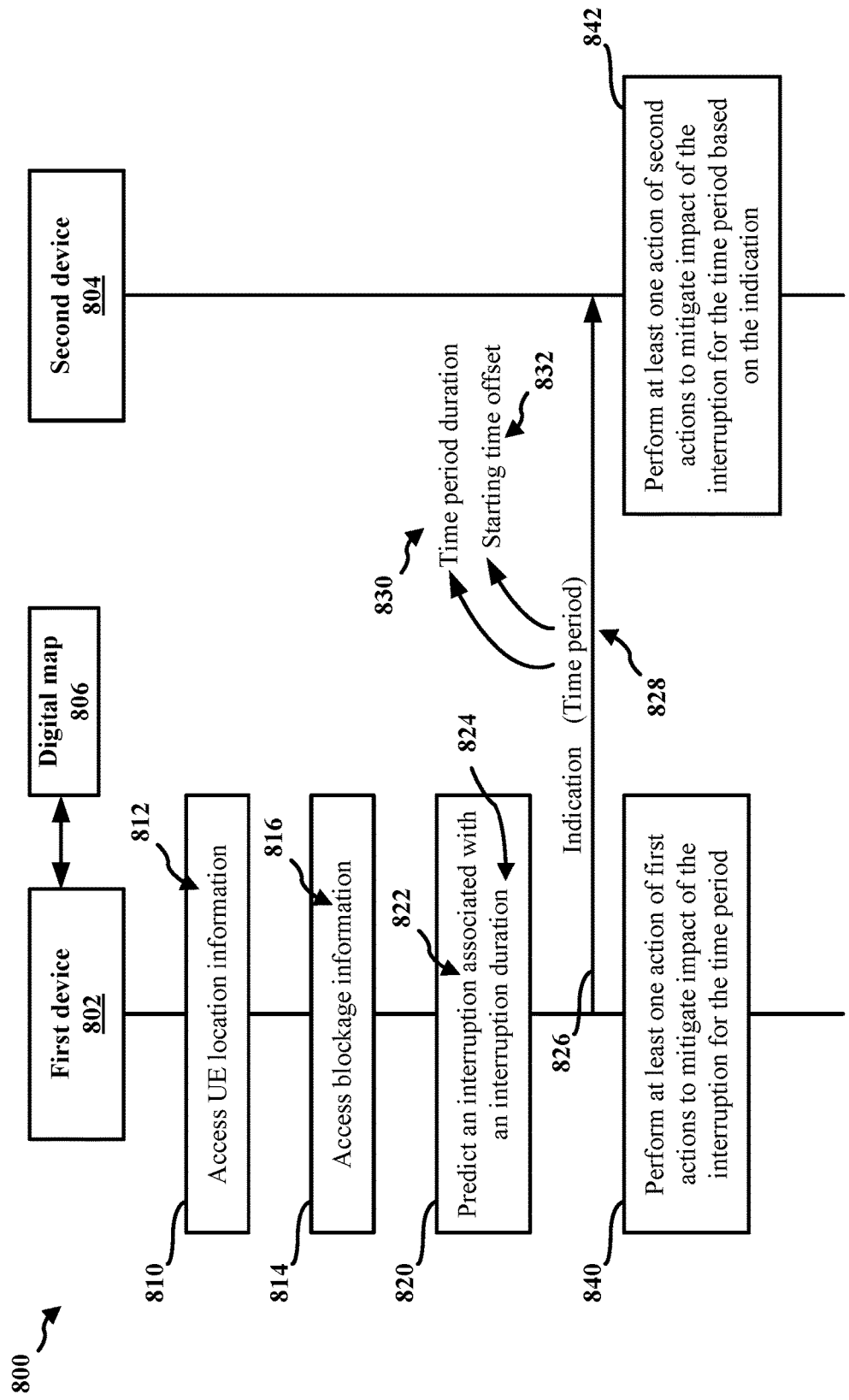
FIG. 8 illustrates an example communication flow between a first device and a second device, in accordance with the teachings disclosed herein.

FIG. 8 illustrates an example communication flow 800 between a first device 802 and a second device 804, as presented herein. The first device 802 and the second device 804 may be components of a satellite-based communication system. For example, the first device 802 may be implemented by a UE and the second device 804 may be implemented by a network entity. In other examples, the first device 802 may be implemented by a network entity and the second device 804 may be implemented by a UE. The network entity may be implemented by a satellite or a ground-based device. The network entity may be implemented by a satellite, an AMF, a base station, or a component of a base station (e.g., a CU, a DU, and/or an RU), etc.

In the illustrated example of FIG. 8, the communication flow 800 facilitates the first device 802 and the second device 804 each taking at least one action to mitigate the impact from a predicted interruption due to an obstruction that blocks LOS propagation between a UE and a satellite for satellite-based communication. A predicting device may predict the interruption based on information available to the predicting device. In the example of FIG. 8, the first device 802 is a device with the capability to predict an interruption in a communication link between a UE and a satellite, such as the service link 610 of FIG. 6. The second device 804 is a device with the capability to receive an indication of the interruption from the first device 802. The first device 802 and the second device 804 may each also perform at least one action to reduce the impact of the interruption in the communication link between the UE and the satellite.

In the illustrated example of FIG. 8, the first device 802 may predict an interruption in a communication link based on information available to the first device 802, such as UE location information and blockage information. For example, the first device 802 may perform a procedure 810 to access UE location information 812 of a UE. The UE location information 812 may include coordinates of the UE, may include a velocity of the UE (e.g., a speed of travel of the UE and a direction of travel of the UE), etc. In some aspects, the first device 802 may access the UE location information 812 via a satellite positioning system. In some aspects, the first device 802 may receive the UE location information 812 from the second device 804. For example, in scenarios in which the second device 804 is implemented by a UE, the second device 804 may have the capability to position its location and then provide the UE location information 812 to the first device 802.

The first device 802 may perform a procedure 814 to access, for an obstruction that blocks LOS propagation between the UE and the satellite, blockage information 816. The blockage information 816 may include location information of an obstruction (e.g., geo-coordinates of the obstruction), may include size information of an obstruction (e.g., dimensions), etc. The obstruction may be an object that blocks LOS propagation and that has a location that is available to the first device 802. For example, the first device 802 may access the blockage information 816 via a digital map, such as the digital map 700 of FIG. 7. In the illustrated example of FIG. 8, the first device 802 has access to a digital map 806 to obtain location information of landmarks represented by the digital map 806. In some examples, the digital map 806 may be stored locally at the first device 802. For example, the digital map 806 may be stored in a memory or storage of the first device 802. In some examples, the digital map 806 may be stored at a server that is accessible to the first device 802. The server may be operated by a network operator (e.g., an operator of the satellite-based communication system) or may be operated by a third party.

In the illustrated example of FIG. 8, the first device 802 performs a procedure 820 to predict an interruption 822 of a communication link, for example, based on the UE location information 812 and the blockage information 816. In some examples, the first device 802 may predict the interruption 822 based on a formula or an equation with inputs including the UE location information 812 and the blockage information 816.

In some examples, the first device 802 may predict the interruption 822 by identifying a current path (e.g., a road, a highway, a waterway, a train route, etc.) that the UE is traveling. For example, the first device 802 may use the digital map 806 to identify the current path of the UE based on the UE location information 812 (e.g., the coordinates of the UE). The first device 802 may then parse the digital map 806 to identify any obstructions that overlap with the current path. For example, and referring to the example of FIG. 7, the first device 802 may use the UE location information 812 and the digital map 806 to identify that the UE 704 is traveling on the first road 706. The first device 802 may also use the direction of travel of the UE 704 (e.g., the direction 720) and the digital map 806 to identify that the obstruction 708 overlaps with the first road 706 and, thus, may cause an interruption in a communication link between a UE and a satellite. However, other examples may employ additional or alternate techniques for predicting an interruption 822 based on at least the UE location information 812 and the blockage information 816.

The interruption 822 may be associated with an interruption duration 824. The interruption duration 824 may correspond to an amount of time that the respective obstruction may block LOS propagation between the UE and the satellite. In some examples, the first device 802 may predict the interruption duration 824 based on the UE location information 812 and the blockage information 816. For example, the first device 802 may use the blockage information 816 to determine a size of the respective obstruction. The first device 802 may use the UE location information 812 to determine a speed of travel of the UE. In such scenarios, the first device 802 may predict the interruption duration 824 associated with the interruption 822 based on the size of the obstruction and the speed of travel of the UE. In some examples, the interruption duration 824 may include a time buffer to account for uncertainty, for example, in the size of the obstruction and/or the speed of the UE.

In the illustrated example of FIG. 8, the first device 802 provides (e.g., transmits or outputs) an indication 826 that is obtained by the second device 804. In some aspects, the first device 802 may provide the indication 826 to the second device 804 via RRC signaling. In some aspects, the first device 802 may provide the indication 826 to the second device 804 in a MAC—control element (MAC-CE). In some aspects, the first device 802 may provide the indication 826 to the second device 804 via control information. For examples, in scenarios in which the first device 802 is implemented by a network entity and the second device 804 is implemented by a UE, the first device 802 may provide the indication 826 to the second device 804 via downlink control information. In other scenarios in which the first device 802 is implemented by a UE and the second device 804 is implemented by a network entity, the first device 802 may provide the indication 826 to the second device 804 via uplink control information.

In the example of FIG. 8, the indication 826 indicates the interruption 822 to the second device 804. In some examples, the indication 826 may indicate a time period 828 associated with the interruption duration 824. The time period 828 may include a time period duration 830 and a starting time offset 832. The time period duration 830 may indicate an amount of time that the first device 802 and the second device 804 may perform at least one action based on the prediction of the interruption 822. For example, the UE and the satellite may set a timer with a value corresponding to the time period duration 830. In some such examples, when the timer is active, the UE and the satellite may perform at least one action to mitigate the impact of the interruption 822.

The starting time offset 832 may indicate a delay from a current time that the timer associated with the time period duration 830 may be active. For example, the second device 804 may receive the indication 826 at a current time and wait to activate the timer associated with the time period duration 830 for an amount of time corresponding to the starting time offset 832. In some examples, the starting time offset 832 may indicate to activate the timer at a future time (e.g., the starting time offset 832 may indicate a non-zero offset). For example, and referring to the example of FIG. 7, the starting time offset 832 may indicate that the interruption duration 710 is starting after the interval 712. For example, the starting time offset 832 may indicate that the interruption duration 824 for the interruption 822 is five seconds (e.g., the interruption duration 710 is five seconds) and the interruption time starts in ten seconds (e.g., the interval 712 is ten seconds). In some such scenarios, the second device 804 may not start performing one or more actions to mitigate the impact of the interruption in response to receiving the indication 826. For example, the second device 804 may wait the duration of the interval 712 before performing the one or more actions to mitigate the impact of the interruption.

In some examples, the starting time offset 832 may indicate to activate the timer at the current time (e.g., without a delay or an offset). For example, and referring to the example of FIG. 7, the time period duration 830 may indicate an amount of time corresponding to the interruption duration 710 and the interval 712. For example, and referring to the above example, the time period duration 830 may indicate an amount of time of 15 seconds corresponding to the interruption duration 710 and the interval 712. In some such examples, the second device 804 may start performing one or more actions to mitigate the impact of the interruption in response to receiving the indication 826. For example, the second device 804 may start an interruption timer with an amount of time corresponding to the time period duration 830.

In some examples, the indication 826 may be an implicit indication of the interruption 822. For example, a network entity may provide an indication 826 that may be configured to cause a UE to transition to a sleep mode for a period of time. In the sleep mode (sometimes referred to as a "low power mode"), the UE may deactivate communication functions and, thus, allow the UE to skip experiencing the impact of the interruption 822. In some examples, a network entity may provide an indication 826 that may be configured to cause the UE to maintain its current configuration and/or skip performing one or more actions for a period of time. For example, the indication 826 may be configured to cause the UE to not perform downlink measurements, to not perform uplink transmissions, to not changes its beam pointing direction, etc., for a period of time. In some examples, a UE may provide an indication 826 that may indicate to the network entity that the UE is not available for communication with the network for a period of time. In the examples in which the indication 826 corresponds to an implicit indication, the period of time may correspond to the interruption duration 824 or the time period 828.

As shown in FIG. 8, the first device 802 may perform at least one action of first actions 840 to mitigate the impact of the interruption 822 for the time period 828. Additionally, the second device 804 may perform at least one action of second actions 842 to mitigate the impact of the interruption 822 for the time period 828 based on the indication 826. The first actions 840 and the second actions 842 may enable the first device 802 and the second device 804, respectively, to operate as if there is no traffic scheduled for the time period 828. For example, the network entity may refrain (e.g., avoid, abstain, skip, or forego) scheduling communications with the UE for the time period 828.

Additionally, the UE may refrain from (e.g., avoid, abstain, skip, or forego) monitoring for downlink communications from the satellite for the time period 828. The UE may also refrain from transmitting uplink communications to the satellite for the time period 828. For example, PUSCH may be scheduled for uplink transmission or PUCCH may be triggered for uplink transmission for a time that overlaps with when the timer associated with the time period duration 830 is active. In some such examples, the UE may skip transmitting the uplink communications for the time period 828. In another example, the UE may be allocated periodic resources for its uplink communications, for example, via a configured grant. If a periodic resource overlaps with when the timer associated with the time period duration 830 is active, the UE may refrain from transmitting the uplink communications for the time period 828.

In some aspects, performing at least one action of the first actions 840 and/or at least one action of the second actions 842 may include refraining from performing one or more procedures. For example, for the time period 828, the UE may refrain (e.g., avoid, abstain, skip, or forego) from performing one or more procedures to correct the communication link. In some examples, the UE may refrain from declaring an RLF for the time period 828. In some examples, the UE may refrain from performing an RRC connection release procedure for the time period 828. In some examples, the UE may refrain from performing beam steering procedures for the time period 828. In some examples, the UE may refrain from performing connection re-establishment (or re-acquisition) procedures with the satellite for the time period 828.

Figure 9:
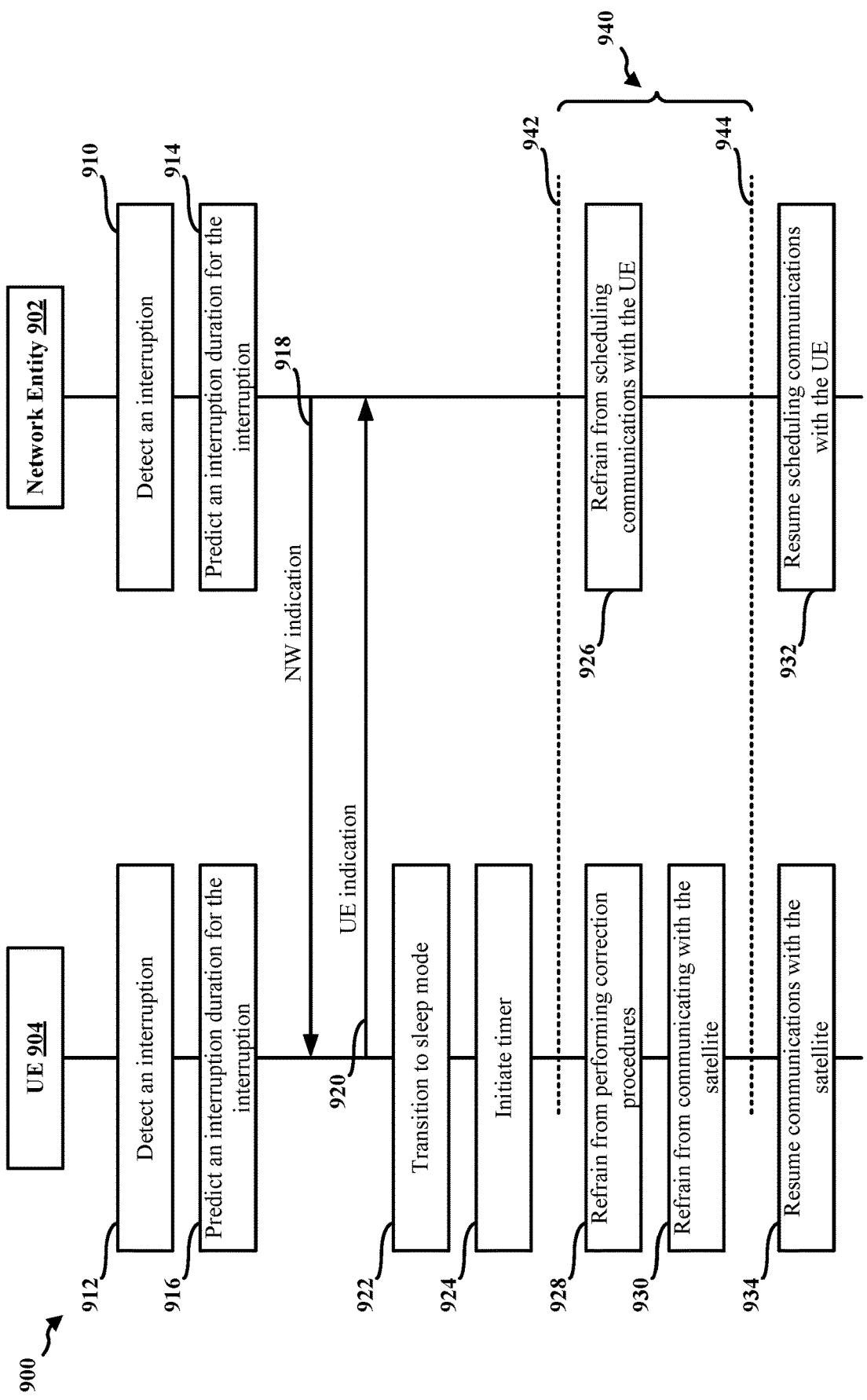
FIG. 9 illustrates an example communication flow between a network entity and a UE, in accordance with the teachings disclosed herein.

FIG. 9 illustrates an example communication flow 900 between a network entity 902 and a UE 904, as presented herein. One or more aspects described for the network entity 902 may be performed by a satellite, a base station, or a component of a base station or a network entity, such as a CU, a DU, an RU, and/or an AMF. In the illustrated example, the communication flow 900 facilitates the UE 904 and the network entity 902 taking actions to mitigate the impact from an interruption due to an obstruction that blocks LOS propagation for satellite-based communication.

Aspects of the network entity 902 may be implemented by the satellite 107 of FIG. 1, one of the base stations 102 of FIG. 1, and/or the base station 410 of FIG. 4. Aspects of the UE 904 may be implemented by one of the UEs 104 of FIG. 1 and/or the UE 450 of FIG. 4. Although not shown in the illustrated example of FIG. 9, in additional or alternative examples, the network entity 902 and/or the UE 904 may be in communication with one or more other base stations or UEs.

In some aspects, the network entity 902 may detect the interruption. For example, the network entity 902 may perform a procedure 910 and detect an interruption. The network entity 902 may detect the interruption based on UE location information and blockage information, such as the UE location information 812 and the blockage information 816, respectively, of FIG. 8. In some aspects, the network entity 902 may obtain or access the blockage information via a digital map, such as the digital map 700 of FIG. 7 and/or the digital map 806 of FIG. 8. Aspects of detecting the interruption are described in connection with the interruption 822 of FIG. 8.

The network entity 902 may perform a procedure 914 to predict an interruption duration associated with the interruption. For example, the network entity 902 may use size information of an obstruction causing the predicted interruption and speed information of the UE 904 to predict an amount of time that the communication link between the UE 904 and the network entity 902 may be interrupted. Aspects of predicting the interruption duration are described in connection with the interruption duration 824 of FIG. 8.

In the illustrated example of FIG. 9, the network entity 902 provides a network indication 918 that is received by the UE 904. The network entity 902 may provide the network indication 918 via RRC signaling, in a MAC-CE, and/or DCI. In some examples, the network indication 918 may indicate the interruption and a time period 940 associated with the interruption duration. The time period 940 may include a time period duration and a starting time offset. In some examples, the time period 940 may correspond to a time window of a future time. For example, the starting time offset may indicate a non-zero value to indicate that the time period duration starts at a future time (e.g., a time offset from the current time). In some examples, the starting time offset of the time period 940 may indicate that the time period duration starts at the current time.

In some aspects, the UE may detect the interruption. For example, the UE 904 may perform a procedure 912 and detect an interruption. The UE 904 may detect the interruption based on UE location information and blockage information, such as the UE location information 812 and the blockage information 816, respectively, of FIG. 8. In some aspects, the UE 904 may obtain or access the blockage information via a digital map, such as the digital map 700 of FIG. 7 and/or the digital map 806 of FIG. 8. Aspects of detecting the interruption are described in connection with the interruption 822 of FIG. 8.

The UE 904 may perform a procedure 916 to predict an interruption duration associated with the interruption. For example, the UE 904 may use size information of an obstruction causing the predicted interruption and speed information of the UE 904 to predict an amount of time that the communication link between the UE 904 and the network entity 902 may be interrupted. Aspects of predicting the interruption duration are described in connection with the interruption duration 824 of FIG. 8.

In the illustrated example of FIG. 9, the UE 904 provides a UE indication 920 that is obtained (e.g., received) by the network entity 902. The UE 904 may provide the UE indication 920 via RRC signaling, in a MAC-CE, and/or UCI. In some examples, the UE indication 920 may indicate the interruption and the time period 940 associated with the interruption duration. The time period 940 may include a time period duration and a starting time offset. In some examples, the time period 940 may correspond to a time window of a future time. For example, the starting time offset may indicate a non-zero value to indicate that the time period duration starts at a future time (e.g., a time offset from the current time). In some examples, the starting time offset of the time period 940 may indicate that the time period duration starts at the current time.

In the illustrated example of FIG. 9, the time period 940 starts at a first time 942 and ends at a second time 944. In examples in which the indication of the interruption (e.g., the network indication 918 or the UE indication 920) corresponds to the time period duration starting at a future time, the duration of the time period 940 may correspond to the interruption duration, such as the interruption duration 710 of FIG. 7 and/or the interruption duration 824 of FIG. 8. For example, the first time 942 may correspond to the time T1 and the second time 944 may correspond to the time T3 of FIG. 7. In examples in which the indication of the interruption (e.g., the network indication 918 or the UE indication 920) corresponds to the time period duration starting at the current time, the time period 940 may correspond to an interruption duration and an offset before the start of the interruption, such as the interruption duration 710 and the interval 712 of FIG. 7. For example, the first time 942 may correspond to the time T0 and the second time 944 may correspond to the time T3 of FIG. 7.

In some examples, the UE 904 may perform a procedure 924 to initiate an interruption timer. The UE 904 may initiate the interruption timer to align with the time period 940. In examples in which the time period duration starts at a future time, the UE 904 may wait for an amount of time based on the starting time offset to initiate the interruption timer (e.g., after the interval 712 of FIG. 7 is complete). In examples in which the time period duration starts at the current time, then the UE 904 may initiate the interruption timer after receiving the network indication 918 or after transmitting the UE indication 920. The duration of the interruption timer may correspond to the time period duration (e.g., the amount of time that the obstruction may block LOS propagation and interrupt communication between the UE 904 and the network entity 902).

In the example of FIG. 9, the network entity 902 and the UE 904 may provide the network indication 918 and the UE indication 920, respectively, so that the network entity 902 and the UE 904 are each aware of the predicted interruption. After receiving the indication, both the network entity 902 and the UE 904 may perform at least one action that may mitigate (or lessen) the impact of the interruption.

In the example of FIG. 9, the network entity 902 may perform a procedure 926 to refrain from scheduling communications with the UE 904 for the time period 940. For example, the network entity 902 may refrain from scheduling downlink communications with the UE 904 for the time period 940. Additionally, or alternatively, the network entity 902 may refrain from scheduling uplink communications with the UE 904 for the time period 940.

As shown in FIG. 9, after the time period 940 associated with the interruption is complete, the network entity 902 may perform a procedure 932 to resume scheduling communications with the UE 904. For example, the network entity 902 may schedule downlink communications with the UE 904 at a time after the second time 944 in the time domain. Additionally, or alternatively, the network entity 902 may schedule uplink communications with the UE 904 at a time after the second time 944 in the time domain.

In the illustrated example of FIG. 9, based on the predicted interruption, the UE 904 may perform at least one action to mitigate the impact of the interruption. For example, for the time period 940, the UE 904 may perform a procedure 928 to refrain from performing one or more communication link correction procedures. In some examples, the UE 904 may refrain from declaring an RLF for the time period 940. In some examples, the UE 904 may refrain from performing an RRC connection release procedure for the time period 940. In some examples, the UE 904 may refrain from performing beam steering procedures for the time period 940. In some examples, the UE 904 may refrain from performing connection re-establishment (or re-acquisition) procedures with the satellite for the time period 940.

In some aspects, the UE 904 perform a procedure 930 to refrain from communicating with a satellite facilitating the satellite-based communication for the time period 940. For example, the UE 904 may refrain from monitoring for downlink communications from the satellite and/or the network entity 902. Additionally, or alternatively, the UE 904 may refrain from transmitting uplink communications for the time period 940. In some examples, the UE 904 may not change its downlink beam pointing direction and/or its uplink beam pointing direction for the time period 940.

As shown in FIG. 9, after the time period 940 associated with the interruption is complete, the UE 904 may perform a procedure 934 to resume communications with the satellite and/or the network entity 902. For example, the UE 904 may receive downlink communications (e.g., PDCCH or PDSCH) from the network entity 902 and/or may transmit uplink communications (e.g., PUCCH or PUSCH) to the network entity 902 at a time after the second time 944 in the time domain. Additionally, the UE 904 may resume communications with the same satellite with which it was communicating before the time period 940. For example, and referring to the example of FIG. 6, the UE 604 may be communicating with the first satellite 606 before the time period 940, may refrain from communicating with the first satellite 606 for the time period 940, and may resume communicating with the first satellite 606 after the time period 940.

The UE 904 may also use the same beam configurations to communicate with the satellite after the time period 940 as before the time period 940. For example, as described in connection with the procedure 930, the UE 904 may not change its downlink beam pointing direction and/or its uplink beam pointing direction for the time period 940. Thus, after the time period 940 is complete, the downlink beam pointing direction and/or the uplink beam pointing direction are the same as before the time period 940.

In some examples, the network indication 918 provided by the network entity 902 may correspond to an implicit indication of an interruption. For example, instead of indicating the interruption and the time period 940, the network indication 918 may be configured to cause the UE 904 to transition to a sleep mode. For example, after receiving the network indication 918, the UE 904 may perform a procedure 922 to transition to a sleep mode. The network indication 918 may indicate a period of time that the UE 904 is to stay in the sleep mode. In some examples, the period of time may be based on the interruption duration or the time period 940. For example, the network indication 918 may be configured to cause the UE 904 to transition to the sleep mode until after the time period 940 is complete.

In some examples, the network indication 918 provided by the network entity 902 may configure the UE 904 to perform or refrain from performing one or more actions for a period of time. For example, the network indication 918 may be configured to cause the UE 904 to not perform downlink measurements for the period of time. In some examples, the network indication 918 may be configured to cause the UE 904 to not perform uplink transmissions for the period of time. In some examples, the network indication 918 may be configured to cause the UE 904 to not change its beam pointing direction for the period of time. In some examples, the period of time may be based on the interruption duration or the time period 940. Thus, the UE 904 may not perform downlink measurements, may not perform uplink transmissions, may not change its beam pointing direction, etc., until the time period 940 is complete.

In some examples, the UE indication 920 provided by the UE 904 may be configured to indicate to the network entity 902 that the UE 904 is unavailable for communication with the network for a period of time. In some examples, the period of time may be based on the interruption duration or the time period 940. For example, the UE indication 920 may indicate to the network entity 902 that the UE 904 is unavailable for communication until the time period 940 is complete.

Figure 10:
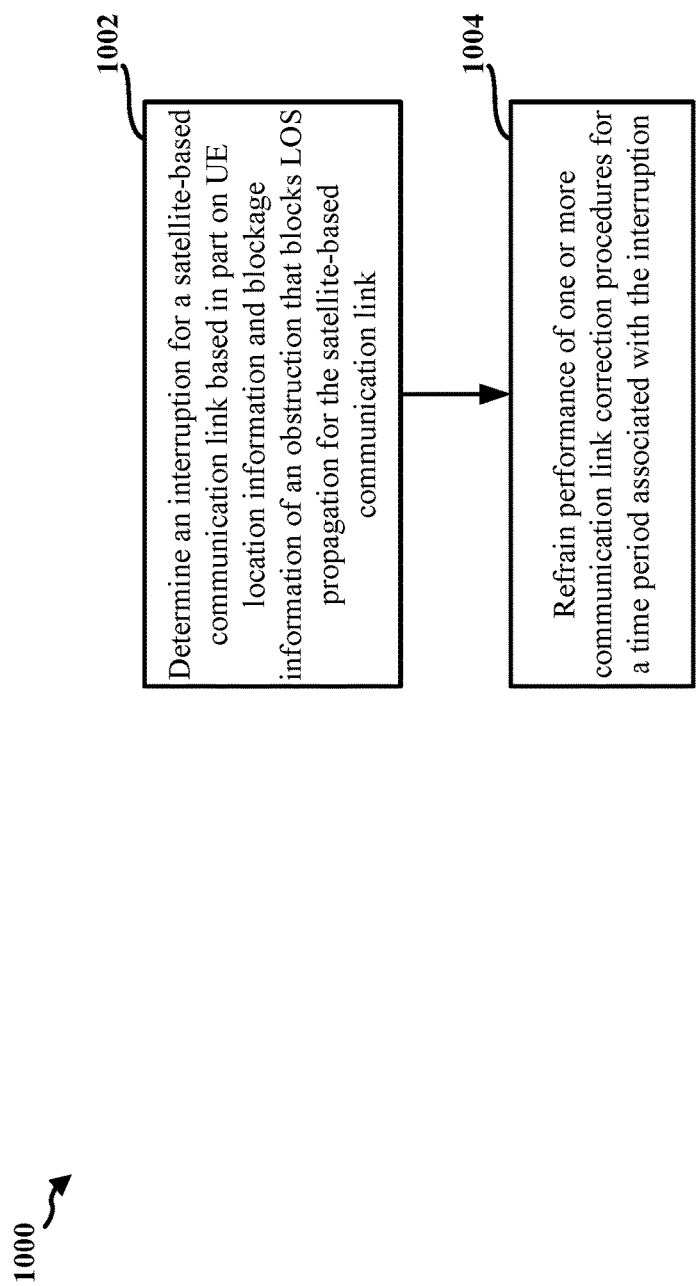
FIG. 10 is a flowchart of a method of wireless communication at a UE, in accordance with the teachings disclosed herein.

FIG. 10 is a flowchart 1000 of a method of wireless communication. The method may be performed by a UE (e.g., one of the UEs 104, and/or an apparatus 1204 of FIG. 12). The method may facilitate improving communication performance associated with satellite-based communication by predicting an interruption and performing one or more actions to mitigate the impact of the interruption.

At 1002, the UE determines an interruption for a satellite-based communication link based in part on UE location information and blockage information of an obstruction that blocks LOS propagation for the satellite-based communication link, as described in connection with at least the interruption 822 of FIG. 8 and/or the procedure 912 of FIG. 9. The determining of the interruption, at 1002, may be performed by the UE interruption handling component 198 of the apparatus 1204 of FIG. 12.

At 1004, the UE refrains performance of one or more communication link correction procedures for a time period associated with the interruption, as described in connection with at least one action of the first actions 840 or at least one action of the second actions 842 of FIG. 8, and/or procedure 928 or the procedure 930 of FIG. 9. The refraining performance of the one or more communication link correction procedures, at 1004, may be performed by the UE interruption handling component 198 of the apparatus 1204 of FIG. 12.

Figure 11:
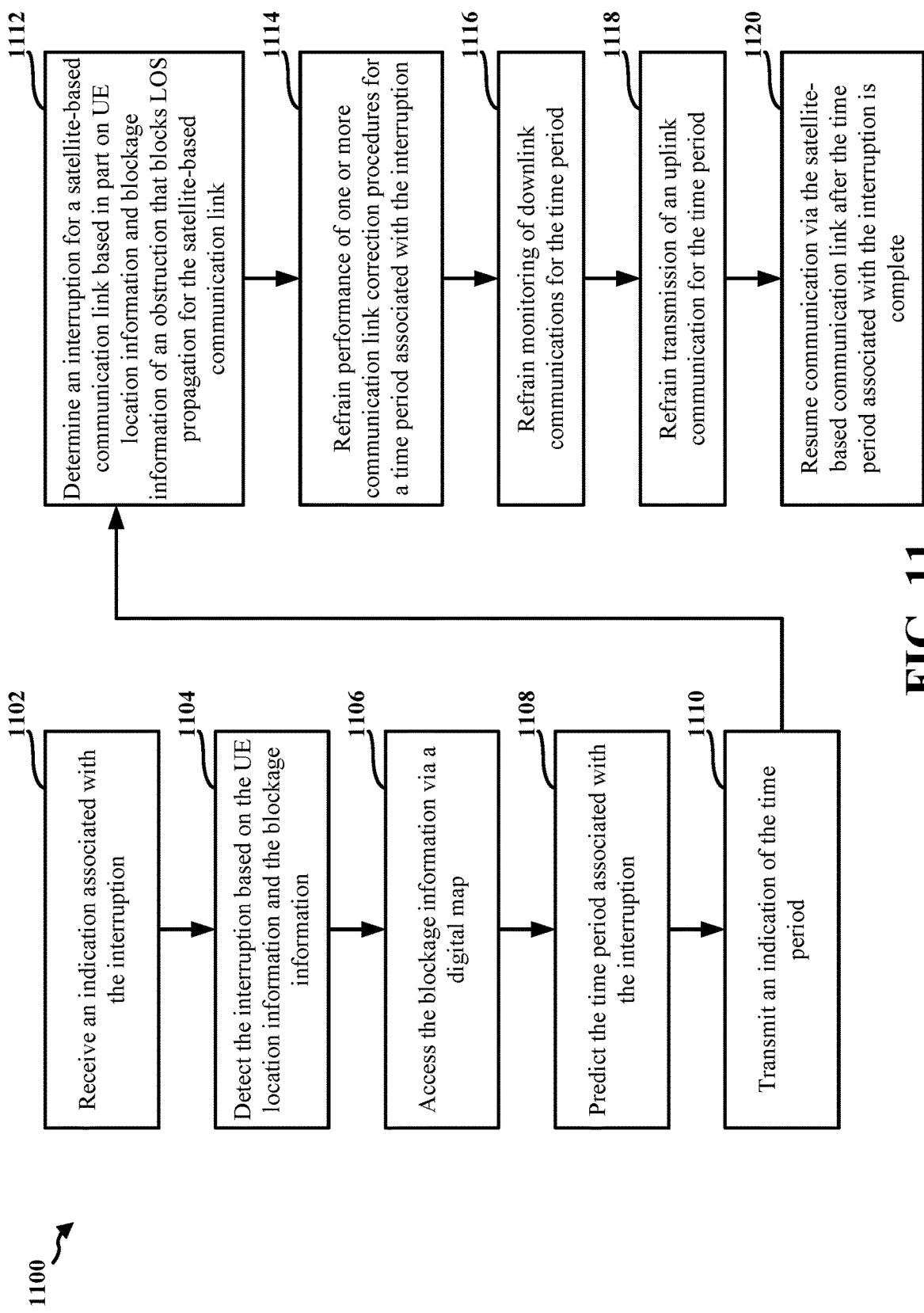
FIG. 11 is a flowchart of a method of wireless communication at a UE, in accordance with the teachings disclosed herein.

FIG. 11 is a flowchart 1100 of a method of wireless communication. The method may be performed by a UE (e.g., one of the UEs 104, and/or an apparatus 1204 of FIG. 12). The method may facilitate improving communication performance associated with satellite-based communication by predicting an interruption and performing one or more actions to mitigate the impact of the interruption.

At 1112, the UE determines an interruption for a satellite-based communication link based in part on UE location information and blockage information of an obstruction that blocks LOS propagation for the satellite-based communication link, as described in connection with at least the interruption 822 of FIG. 8 and/or the procedure 912 of FIG. 9. The determining of the interruption, at 1112, may be performed by the UE interruption handling component 198 of the apparatus 1204 of FIG. 12.

At 1114, the UE refrains performance of one or more communication link correction procedures for a time period associated with the interruption, as described in connection with at least one action of the first actions 840 or at least one action of the second actions 842 of FIG. 8, and/or procedure 928 or the procedure 930 of FIG. 9. In some examples, the one or more communication link correction procedures may include a declaration of RLF. In some examples, the one or more communication link correction procedures may include RRC connection release procedures. In some examples, the one or more communication link correction procedures may include new satellite search procedures. In some examples, the one or more communication link correction procedures may include beam search procedures. The refraining performance of the one or more communication link correction procedures, at 1114, may be performed by the UE interruption handling component 198 of the apparatus 1204 of FIG. 12.

In some examples, the UE may refrain from communicating via the satellite-based communication link based on the interruption. For example, at 1116, the UE may refrain monitoring of downlink communications for the time period, as described in connection with at least the first actions 840 and the second actions 842 of FIG. 8, and/or the procedure 930 of FIG. 9. Additionally, at 1118, the UE may refrain transmission of an uplink communication for the time period, as described in connection with at least the first actions 840 and second actions 842 of FIG. 8, and/or the procedure 930 of FIG. 9. The refraining from communicating via the satellite-based communication link, at 1116 and 1118, may be performed by the UE interruption handling component 198 of the apparatus 1204 of FIG. 12.

At 1120, the UE may resume communication via the satellite-based communication link after the time period associated with the interruption is complete, as described in connection with at least the procedure 934 of FIG. 9. The resuming of the communication via the satellite-based communication link, at 1120, may be performed by the UE interruption handling component 198 of the apparatus 1204 of FIG. 12.

In some examples, the UE may determine the interruption (e.g., at 1112) based on a received indication. For example, at 1102, the UE may receive an indication associated with the interruption, as described in connection with at least the indication 826 of FIG. 8 and/or the network indication 918 of FIG. 9. In some examples, the UE may receive the indication via RRC signaling. In some examples, the UE may receive the indication via a MAC-CE. In some examples, the UE may receive the indication via DCI. The receiving of the indication, at 1102, may be performed by the UE interruption handling component 198 of the apparatus 1204 of FIG. 12.

In some examples, the indication may indicate the time period including a time period duration and a starting time offset for a future time.

In some examples, the indication may indicate the time period including a time period duration and a starting time offset for a current time. In some such examples, the UE may initiate a timer after reception of the indication, as described in connection with at the procedure 924 of FIG. 9.

In some examples, the indication may be configured to cause the UE to transition to a sleep mode for a duration of time based on the time period, as described in connection with at least the procedure 922 of FIG. 9.

In some examples, the indication may be configured to cause the UE to refrain the performance of the one or more communication link correction procedures for a duration of time based on the time period, as described in connection with at least one action of the second actions 842 of FIG. 8 and/or the procedure 928 of FIG. 9.

In some examples, the UE may determine the interruption (e.g., at 1112) based on performing a prediction of the interruption. For example, at 1104, the UE may detect the interruption based on the UE location information and the blockage information, as described in connection with at least the procedure 820 of FIG. 8 and/or the procedure 912 of FIG. 9. The detecting of the interruption, at 1104, may be performed by the UE interruption handling component 198 of the apparatus 1204 of FIG. 12.

At 1106, the UE may access the blockage information via a digital map, as described in connection with at least the digital map 806 and the blockage information 816 of FIG. 8. The accessing of the blockage information, at 1106, may be performed by the UE interruption handling component 198 of the apparatus 1204 of FIG. 12.

At 1108, the UE may predict the time period associated with the interruption, as described in connection with at least the interruption duration 824 of FIG. 8 and/or the procedure 916 of FIG. 9. The predicting of the time period, at 1108, may be performed by the UE interruption handling component 198 of the apparatus 1204 of FIG. 12.

At 1110, the UE may transmit an indication of the time period, as described in connection with at least the indication 826 of FIG. 8 and/or the UE indication 920 of FIG. 9. In some examples, the UE may transmit the indication via RRC signaling. In some examples, the UE may transmit the indication via a MAC-CE. In some examples, the UE may transmit the indication via UCI. The transmitting of the indication, at 1110, may be performed by the UE interruption handling component 198 of the apparatus 1204 of FIG. 12.

In some examples, the indication may indicate the time period including a time period duration and a starting time offset for a future time.

In some examples, the indication may indicate the time period including a time period duration and a starting time offset for a current time.

In some examples, the indication may indicate a duration of time that the UE is unavailable for communication via the satellite-based communication link, as described in connection with at least the first actions 840 of FIG. 8 and/or the UE indication 920 of FIG. 9. The duration of the time may be based on the time period.

Figure 12:
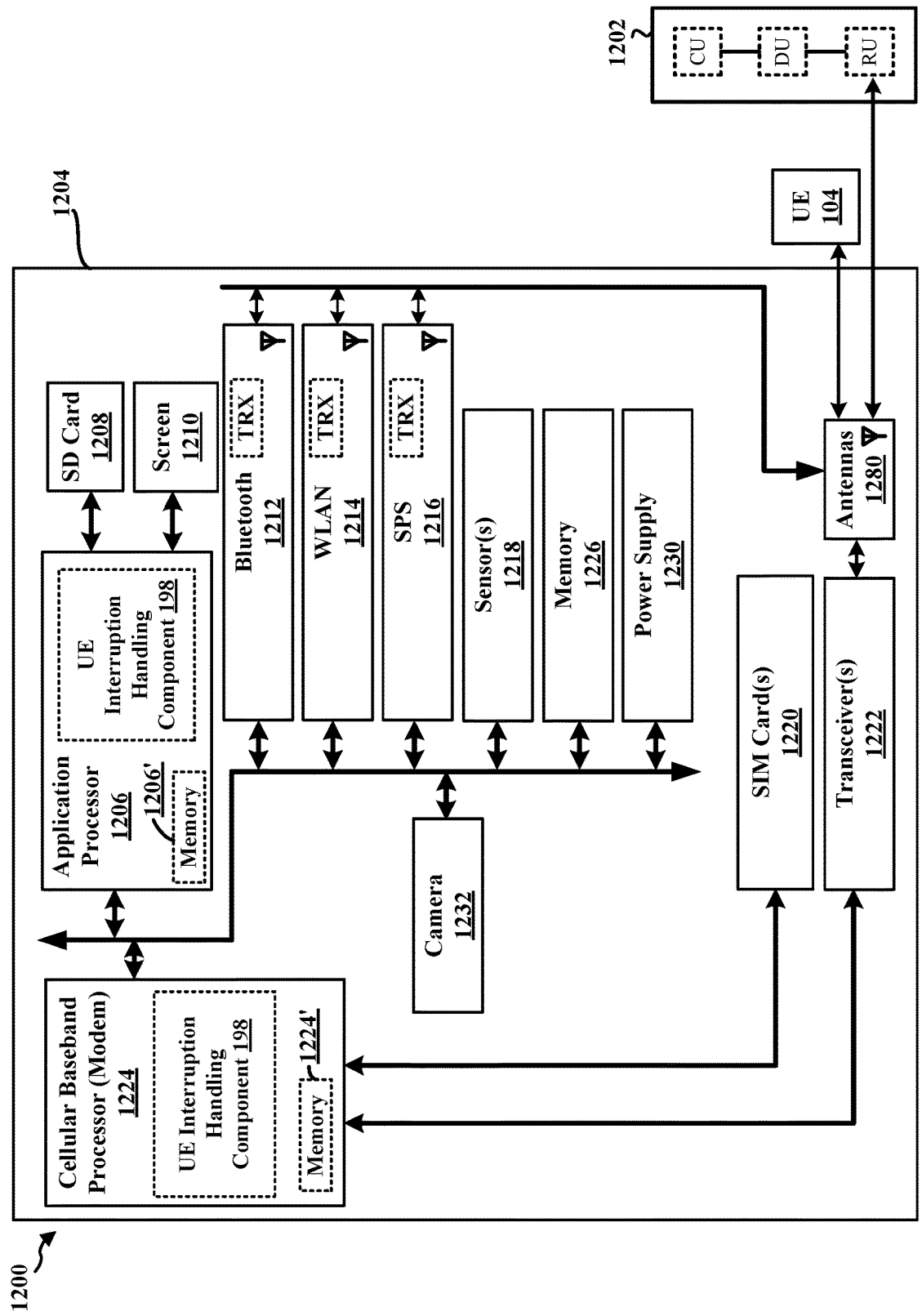
FIG. 12 is a diagram illustrating an example of a hardware implementation for an example apparatus and/or network entity.

FIG. 12 is a diagram 1200 illustrating an example of a hardware implementation for an apparatus 1204. The apparatus 1204 may be a UE, a component of a UE, or may implement UE functionality. In some aspects, the apparatus 1204 may include a cellular baseband processor 1224 (also referred to as a modem) coupled to one or more transceivers (e.g., a cellular RF transceiver 1222). The cellular baseband processor 1224 may include on-chip memory 1224'. In some aspects, the apparatus 1204 may further include one or more subscriber identity modules (SIM) cards 1220 and an application processor 1206 coupled to a secure digital (SD) card 1208 and a screen 1210. The application processor 1206 may include on-chip memory 1206'. In some aspects, the apparatus 1204 may further include a Bluetooth module 1212, a WLAN module 1214, an SPS module 1216 (e.g., GNSS module), one or more sensor modules 1218 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1226, a power supply 1230, and/or a camera 1232. The Bluetooth module 1212, the WLAN module 1214, and the SPS module 1216 may include an on-chip transceiver (TRX) (or in some cases, just a receiver (RX)). The Bluetooth module 1212, the WLAN module 1214, and the SPS module 1216 may include their own dedicated antennas and/or utilize one or more antennas 1280 for communication. The cellular baseband processor 1224 communicates through transceiver(s) (e.g., the cellular RF transceiver 1222) via one or more antennas 1280 with one of the UEs 104 and/or with an RU associated with a network entity 1202. The cellular baseband processor 1224 and the application processor 1206 may each include a computer-readable medium/memory, such as the on-chip memory 1224', and the on-chip memory 1206', respectively. The additional memory modules 1226 may also be considered a computer-readable medium/ memory. Each computer-readable medium/memory (e.g., the on-chip memory 1224', the on-chip memory 1206', and/or the additional memory modules 1226) may be non-transitory. The cellular baseband processor 1224 and the application processor 1206 are each responsible for general processing, including the execution of software stored on the computer-readable medium/memory. The software, when executed by the cellular baseband processor 1224/application processor 1206, causes the cellular baseband processor 1224/application processor 1206 to perform the various functions described supra. The computer-readable medium/ memory may also be used for storing data that is manipulated by the cellular baseband processor 1224/application processor 1206 when executing software. The cellular baseband processor 1224/application processor 1206 may be a component of the UE 450 and may include the memory 460 and/or at least one of the TX processor 468, the RX processor 456, and the controller/processor 459. In one configuration, the apparatus 1204 may be a processor chip (modem and/or application) and include just the cellular baseband processor 1224 and/or the application processor 1206, and in another configuration, the apparatus 1204 may be the entire UE (e.g., see the UE 450 of FIG. 4) and include the additional modules of the apparatus 1204.

As discussed supra, the UE interruption handling component 198 may be configured to: determine an interruption for a satellite-based communication link based in part on UE location information and blockage information of an obstruction that blocks LOS propagation for the satellite-based communication link; and refrain performance of one or more communication link correction procedures for a time period associated with the interruption.

The UE interruption handling component 198 may be within the cellular baseband processor 1224, the application processor 1206, or both the cellular baseband processor 1224 and the application processor 1206. The UE interruption handling component 198 may be one or more hardware components specifically configured to carry out the stated processes/algorithm, implemented by one or more processors configured to perform the stated processes/algorithm, stored within a computer-readable medium for implementation by one or more processors, or some combination thereof.

As shown, the apparatus 1204 may include a variety of components configured for various functions. For example, the UE interruption handling component 198 may include one or more hardware components that perform each of the blocks of the algorithm in the flowcharts of FIG. 10 and/or FIG. 11.

In one configuration, the apparatus 1204, and in particular the cellular baseband processor 1224 and/or the application processor 1206, may include means for determining an interruption for a satellite-based communication link based in part on UE location information and blockage information of an obstruction that blocks LOS propagation for the satellite-based communication link. The example apparatus 1204 also includes means for refraining performance of one or more communication link correction procedures for a time period associated with the interruption.

In another configuration, the example apparatus 1204 also includes means for refraining monitoring of downlink communications for the time period. The example apparatus 1204 also includes means for refraining transmission of an uplink communication for the time period.

In another configuration, the example apparatus 1204 also includes means for resuming communication via the satellite-based communication link after the time period associated with the interruption is complete.

In another configuration, the example apparatus 1204 also includes means for receiving an indication associated with the interruption.

In another configuration, the example apparatus 1204 also includes means for initiating a timer after reception of the indication.

In another configuration, the example apparatus 1204 also includes means for receiving the indication via at least one of RRC signaling, a MAC-CE, or downlink control information.

In another configuration, the example apparatus 1204 also includes means for detecting the interruption based on the UE location information and the blockage information. The example apparatus 1204 also includes means for predicting the time period associated with the interruption. The example apparatus 1204 also includes means for transmitting an indication of the time period.

In another configuration, the example apparatus 1204 also includes means for accessing the blockage information via a digital map.

In another configuration, the example apparatus 1204 also includes means for transmitting the indication via at least one of RRC signaling, via a MAC-CE, and uplink control information.

The means may be the UE interruption handling component 198 of the apparatus 1204 configured to perform the functions recited by the means. As described supra, the apparatus 1204 may include the TX processor 468, the RX processor 456, and the controller/processor 459. As such, in one configuration, the means may be the TX processor 468, the RX processor 456, and/or the controller/processor 459 configured to perform the functions recited by the means.

Figure 13:
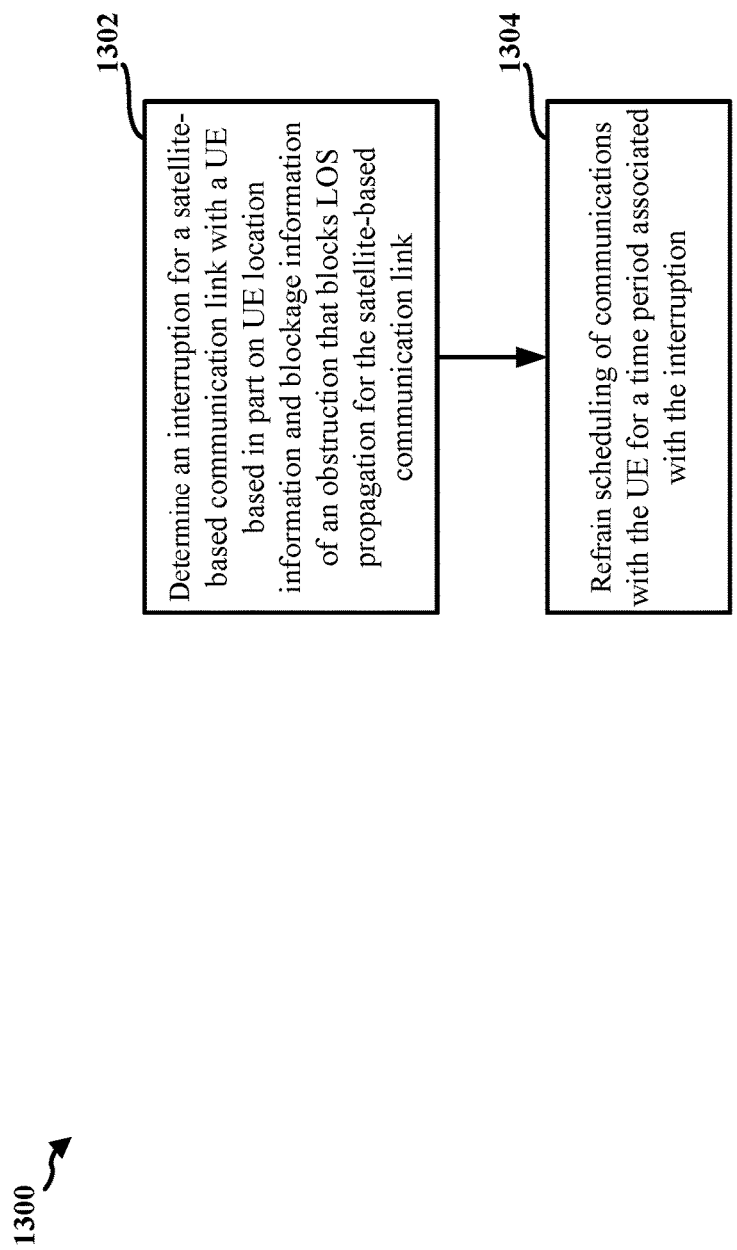
FIG. 13 is a flowchart of a method of wireless communication at a network entity, in accordance with the teachings disclosed herein.

FIG. 13 is a flowchart 1300 of a method of wireless communication. The method may be performed by a network node (e.g., one of the base stations 102, and/or a network entity 1502 of FIG. 15). The method may facilitate improving communication performance associated with satellite-based communication by predicting an interruption and performing one or more actions to mitigate the impact of the interruption.

At 1302, the network node determines an interruption for a satellite-based communication link with a UE based in part on UE location information and blockage information of an obstruction that blocks LOS propagation for the satellite-based communication link, as described in connection with at least the interruption 822 of FIG. 8 and/or the procedure 912 of FIG. 9. The determining of the interruption, at 1302, may be performed by the NW interruption handling component 199 of the network entity 1502 of FIG. 15.

At 1304, the network node refrains scheduling of communications with the UE for a time period associated with the interruption, as described in connection with at least one action of the first actions 840 or at least one action of the second actions 842 of FIG. 8, and/or the procedure 926 of FIG. 9. The refraining of the scheduling of communications, at 1304, may be performed by the NW interruption handling component 199 of the network entity 1502 of FIG. 15.

Figure 14:
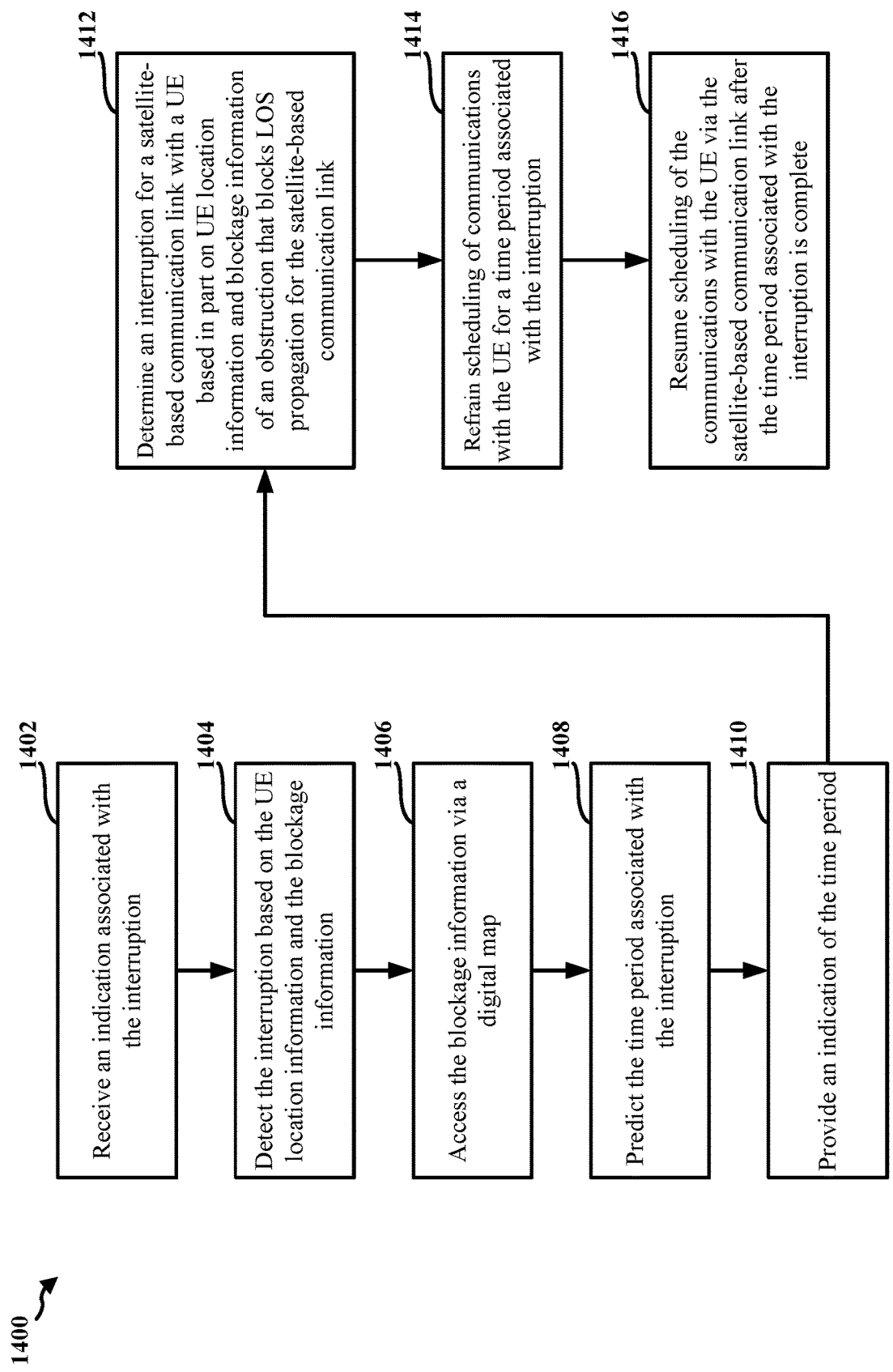
FIG. 14 is a flowchart of a method of wireless communication at a network entity, in accordance with the teachings disclosed herein.

FIG. 14 is a flowchart 1400 of a method of wireless communication. The method may be performed by a network node (e.g., one of the base stations 102, and/or a network entity 1502 of FIG. 15). The method may facilitate improving communication performance associated with satellite-based communication by predicting an interruption and performing one or more actions to mitigate the impact of the interruption.

At 1412, the network node determines an interruption for a satellite-based communication link with a UE based in part on UE location information and blockage information of an obstruction that blocks LOS propagation for the satellite-based communication link, as described in connection with at least the interruption 822 of FIG. 8 and/or the procedure 912 of FIG. 9. The determining of the interruption, at 1412, may be performed by the NW interruption handling component 199 of the network entity 1502 of FIG. 15.

At 1414, the network node refrains scheduling of communications with the UE for a time period associated with the interruption, as described in connection with at least one action of the first actions 840 or at least one action of the second actions 842 of FIG. 8, and/or the procedure 926 of FIG. 9. The refraining of the scheduling of communications, at 1414, may be performed by the NW interruption handling component 199 of the network entity 1502 of FIG. 15.

At 1416, the network node may resume scheduling of the communications with the UE via the satellite-based communication link after the time period associated with the interruption is complete, as described in connection with at least the procedure 932 of FIG. 9. The resuming of the scheduling, at 1416, may be performed by the NW interruption handling component 199 of the network entity 1502 of FIG. 15.

In some examples, the network node may determine the interruption (e.g., at 1412) based on a received indication. For example, at 1402, the network node may receive an indication associated with the interruption, as described in connection with the at least the indication 826 of FIG. 8 and/or the UE indication 920 of FIG. 9. In some examples, the network node may receive the indication via RRC signaling. In some examples, the network node may receive the indication via a MAC-CE. In some examples, the network node may receive the indication via UCI. The receiving of the indication, at 1402, may be performed by the NW interruption handling component 199 of the network entity 1502 of FIG. 15.

In some examples, the indication may indicate the time period including a time period duration and a starting time offset for a future time.

In some examples, the indication may indicate the time period including a time period duration and a starting time offset for a current time.

In some examples, the indication may indicate a duration of time that the UE is unavailable for communication via the satellite-based communication link, the duration of the time being based on the time period, as described in connection with at least the first actions 840 of FIG. 8 and/or the UE indication 920 of FIG. 9.

In some examples, the network entity may determine the interruption (e.g., at 1412) based on performing a prediction of the interruption. For example, at 1404, the network node may detect the interruption based on the UE location information and the blockage information, as described in connection with at least the procedure 820 of FIG. 8 and/or the procedure 910 of FIG. 9. The detecting of the interruption, at 1404, may be performed by the NW interruption handling component 199 of the network entity 1502 of FIG. 15.

In some examples, the network node may access, at 1406, the blockage information via a digital map, as described in connection with at least the digital map 806 and the blockage information 816 of FIG. 8. The accessing of the blockage information, at 1406, may be performed by the NW interruption handling component 199 of the network entity 1502 of FIG. 15.

At 1408, the network node may predict the time period associated with the interruption, as described in connection with at least the interruption duration 824 of FIG. 8 and/or the procedure 914 of FIG. 9. The predicting of the time period, at 1408, may be performed by the NW interruption handling component 199 of the network entity 1502 of FIG. 15.

At 1410, the network node may provide an indication of the time period, as described in connection with at least the indication 826 of FIG. 8 and/or the network indication 918 of FIG. 9. In some examples, the network node may provide the indication via RRC signaling. In some examples, the network node may provide the indication via a MAC-CE. In some examples, the network node may provide the indication via DCI. The providing of the indication, at 1410, may be performed by the NW interruption handling component 199 of the network entity 1502 of FIG. 15.

In some examples, the indication may indicate the time period including a time period duration and a starting time offset for a future time.

In some examples, the indication may indicate the time period including a time period duration and a starting time offset for a current time.

In some examples, the indication may be configured to cause the UE to transition to a sleep mode for a duration of time based on the time period, as described in connection with at least the procedure 922 of FIG. 9.

In some examples, the indication may be configured to cause the UE to refrain performance of one or more communication link correction procedures for a duration of time based on the time period, as described in connection with at least the second actions 842 of FIG. 8 and/or the procedure 928 of FIG. 9.

Figure 15:
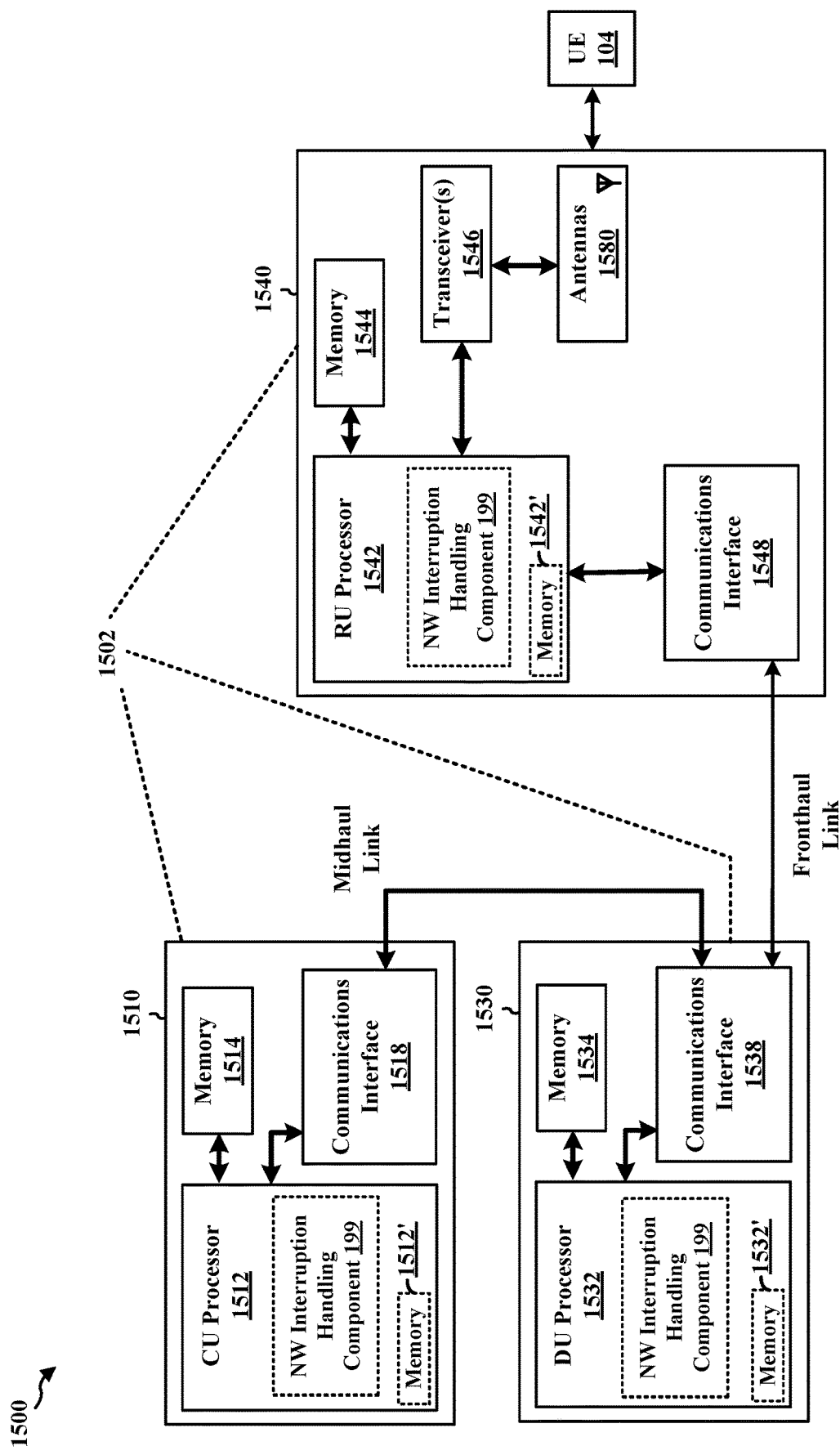
FIG. 15 is a diagram illustrating an example of a hardware implementation for an example network entity.

FIG. 15 is a diagram 1500 illustrating an example of a hardware implementation for a network entity 1502. The network entity 1502 may be a BS, a component of a BS, or may implement BS functionality. The network entity 1502 may include at least one of a CU 1510, a DU 1530, or an RU 1540. For example, depending on the layer functionality handled by the NW interruption handling component 199, the network entity 1502 may include the CU 1510; both the CU 1510 and the DU 1530; each of the CU 1510, the DU 1530, and the RU 1540; the DU 1530; both the DU 1530 and the RU 1540; or the RU 1540. The CU 1510 may include a CU processor 1512. The CU processor 1512 may include on-chip memory 1512'. In some aspects, the CU may further include additional memory modules 1514 and a communications interface 1518. The CU 1510 communicates with the DU 1530 through a midhaul link, such as an F1 interface. The DU 1530 may include a DU processor 1532. The DU processor 1532 may include on-chip memory 1532'. In some aspects, the DU 1530 may further include additional memory modules 1534 and a communications interface 1538. The DU 1530 communicates with the RU 1540 through a fronthaul link. The RU 1540 may include an RU processor 1542. The RU processor 1542 may include on-chip memory 1542'. In some aspects, the RU 1540 may further include additional memory modules 1544, one or more transceivers 1546, antennas 1580, and a communications interface 1548. The RU 1540 communicates with one of the UEs 104. The on-chip memories (e.g., the on-chip memory 1512', the on-chip memory 1532', and/or the on-chip memory 1542') and/or the additional memory modules (e.g., the additional memory modules 1514, the additional memory modules 1534, and/or the additional memory modules 1544) may each be considered a computer-readable medium/memory. Each computer-readable medium/memory may be non-transitory. Each of the CU processor 1512, the DU processor 1532, the RU processor 1542 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the NW interruption handling component 199 may be configured to: determine an interruption for a satellite-based communication link with a UE based in part on UE location information and blockage information of an obstruction that blocks LOS propagation for the satellite-based communication link; and refrain scheduling of communications with the UE for a time period associated with the interruption.

The NW interruption handling component 199 may be within one or more processors of one or more of the CU 1510, DU 1530, and the RU 1540. The NW interruption handling component 199 may be one or more hardware components specifically configured to carry out the stated processes/algorithm, implemented by one or more processors configured to perform the stated processes/algorithm, stored within a computer-readable medium for implementation by one or more processors, or some combination thereof.

The network entity 1502 may include a variety of components configured for various functions. For example, the NW interruption handling component 199 may include one or more hardware components that perform each of the blocks of the algorithm in the flowcharts of FIG. 13 and/or FIG. 14.

In one configuration, the network entity 1502 may include means for determining an interruption for a satellite-based communication link with a UE based in part on UE location information and blockage information of an obstruction that blocks LOS propagation for the satellite-based communication link. The example network entity 1502 also includes means for refraining scheduling of communications with the UE for a time period associated with the interruption.

In another configuration, the example network entity 1502 also includes means for resuming scheduling of the communications with the UE via the satellite-based communication link after the time period associated with the interruption is complete.

In another configuration, the example network entity 1502 also includes means for receiving an indication associated with the interruption.

In another configuration, the example network entity 1502 also includes means for receiving the indication via at least one of RRC signaling, via a MAC-CE, and uplink control information.

In another configuration, the example network entity 1502 also includes means for detecting the interruption based on the UE location information and the blockage information. The example network entity 1502 also includes means for predicting the time period associated with the interruption. The example network entity 1502 also includes means for providing an indication of the time period.

In another configuration, the example network entity 1502 also includes means for accessing the blockage information via a digital map.

In another configuration, the example network entity 1502 also includes means for providing the indication via at least one of RRC signaling, a MAC-CE, or downlink control information.

The means may be the NW interruption handling component 199 of the network entity 1502 configured to perform the functions recited by the means. As described supra, the network entity 1502 may include the TX processor 416, the RX processor 470, and the controller/processor 475. As such, in one configuration, the means may be the TX processor 416, the RX processor 470, and/or the controller/processor 475 configured to perform the functions recited by the means.

Aspects disclosed herein provide techniques for predicting an occurrence of an interruption in a communication link between a UE and a satellite, for example, due to an obstruction blocking LOS propagation via the communication link. For example, disclosed techniques include using location information of an obstruction to predict when an interruption in a satellite-based communication link between a UE and a satellite facilitating the satellite-based communication may occur. The network and the UE may then exchange information regarding the predicted interruption. In some aspects disclosed herein, the network and the UE may perform one or more actions to mitigate the impact from the predicted interruption.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular in the previous description and the claims does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE, including: determining an interruption for a satellite-based communication link based in part on UE location information and blockage information of an obstruction that blocks LOS propagation for the satellite-based communication link; and refraining performance of one or more communication link correction procedures for a time period associated with the interruption.

Aspect 2 is the method of aspect 1, further including that the one or more communication link correction procedures includes at least one of: a declaration of RLF; an RRC connection release procedure; a new satellite search procedure; and a beam search procedure.

Aspect 3 is the method of any of aspects 1 and 2, further including: refraining monitoring of downlink communications for the time period; and refraining transmission of an uplink communication for the time period.

Aspect 4 is the method of any of aspects 1 to 3, further including: resuming communication via the satellite-based communication link after the time period associated with the interruption is complete.

Aspect 5 is the method of any of aspects 1 to 4, further including: receiving an indication associated with the interruption.

Aspect 6 is the method of any of aspects 1 to 5, further including that the indication indicates the time period including a time period duration and a starting time offset for a future time.

Aspect 7 is the method of any of aspects 1 to 5, further including that the indication indicates the time period including a time period duration and a starting time offset for a current time, and the method further includes: initiating a timer after reception of the indication.

Aspect 8 is the method of any of aspects 1 to 5, further including that the indication is configured to cause the UE to transition to a sleep mode for a duration of time based on the time period.

Aspect 9 is the method of any of aspects 1 to 5, further including that the indication is configured to cause the UE to refrain the performance of the one or more communication link correction procedures for a duration of time based on the time period.

Aspect 10 is the method of any of aspects 1 to 9, further including: receiving the indication via at least one of RRC signaling, a MAC-CE, or downlink control information.

Aspect 11 is the method of any of aspects 1 to 4, further including: detecting the interruption based on the UE location information and the blockage information; predicting the time period associated with the interruption; and transmitting an indication of the time period.

Aspect 12 is the method of any of aspects 1 to 4 and 11, further including: accessing the blockage information via a digital map.

Aspect 13 is the method of any of aspects 1 to 4, 11 and 12, further including that the indication indicates the time period including a time period duration and a starting time offset for a future time.

Aspect 14 is the method of any of aspects 1 to 4, 11 and 12, further including the indication indicates the time period including a time period duration and a starting time offset for a current time.

Aspect 15 is the method of any of aspects 1 to 4, 11 and 12, further including that the indication indicates a duration of time that the UE is unavailable for communication via the satellite-based communication link, the duration of the time being based on the time period.

Aspect 16 is the method of any of aspects 1 to 4 and 11 to 15, further including: transmitting the indication via at least one of RRC signaling, via a MAC-CE, and uplink control information.

Aspect 17 is an apparatus for wireless communication at a UE including at least one processor coupled to a memory and configured to implement any of aspects 1 to 16.

In aspect 18, the apparatus of aspect 17 further includes at least one antenna coupled to the at least one processor.

In aspect 19, the apparatus of aspect 17 or 18 further includes a transceiver coupled to the at least one processor.

Aspect 20 is an apparatus for wireless communication including means for implementing any of aspects 1 to 16.

In aspect 21, the apparatus of aspect 20 further includes at least one antenna coupled to the means to perform the method of any of aspects 1 to 16.

In aspect 22, the apparatus of aspect 20 or 21 further includes a transceiver coupled to the means to perform the method of any of aspects 1 to 16.

Aspect 23 is a non-transitory computer-readable storage medium storing computer executable code, where the code, when executed, causes a processor to implement any of aspects 1 to 16.

Aspect 24 is a method of wireless communication at a network entity, including: determining an interruption for a satellite-based communication link with a UE based in part on UE location information and blockage information of an obstruction that blocks LOS propagation for the satellite-based communication link; and refraining scheduling of communications with the UE for a time period associated with the interruption.

Aspect 25 is the method of aspect 24, further including: resuming scheduling of the communications with the UE via the satellite-based communication link after the time period associated with the interruption is complete.

Aspect 26 is the method of any of aspects 24 and 25, further including receiving an indication associated with the interruption.

Aspect 27 is the method of any of aspects 24 to 26, further including the indication indicates the time period including a time period duration and a starting time offset for a future time.

Aspect 28 is the method of any of aspects 24 to 26, further including that the indication indicates the time period including a time period duration and a starting time offset for a current time.

Aspect 29 is the method of any of aspects 24 to 26, further including that the indication indicates a duration of time that the UE is unavailable for communication via the satellite-based communication link, the duration of the time being based on the time period.

Aspect 30 is the method of any of aspects 24 to 29, further including that the at least one processor is configured: receiving the indication via at least one of RRC signaling, via a MAC-CE, and uplink control information.

Aspect 31 is the method of any of aspects 24 and 25, further including: detecting the interruption based on the UE location information and the blockage information; predicting the time period associated with the interruption; and providing an indication of the time period.

Aspect 32 is the method of any of aspects 24 to 25 and 31, further including: accessing the blockage information via a digital map.

Aspect 33 is the method of any of aspects 24 to 25, 31 and 32, further including that the indication indicates the time period including a time period duration and a starting time offset for a future time.

Aspect 34 is the method of any of aspects 24 to 25, 31 and 32, further including that the indication indicates the time period including a time period duration and a starting time offset for a current time.

Aspect 35 is the method of any of aspects 24 to 25, 31 and 32, further including that the indication is configured to cause the UE to transition to a sleep mode for a duration of time based on the time period.

Aspect 36 is the method of any of aspects 24 to 25, 31 and 32, further including that the indication is configured to cause the UE to refrain performance of one or more communication link correction procedures for a duration of time based on the time period.

Aspect 37 is the method of any of aspects 24 to 25 and 31 to 36, further including: providing the indication via at least one of RRC signaling, a MAC-CE, or downlink control information.

Aspect 38 is an apparatus for wireless communication at a network entity including at least one processor coupled to a memory and configured to implement any of aspects 24 to 37.

In aspect 39, the apparatus of aspect 38 further includes at least one antenna coupled to the at least one processor.

In aspect 40, the apparatus of aspect 38 or 39 further includes a transceiver coupled to the at least one processor.

Aspect 41 is an apparatus for wireless communication including means for implementing any of aspects 24 to 37.

In aspect 42, the apparatus of aspect 41 further includes at least one antenna coupled to the means to perform the method of any of aspects 24 to 37.

In aspect 43, the apparatus of aspect 41 or 42 further includes a transceiver coupled to the means to perform the method of any of aspects 24 to 37.

Aspect 44 is a non-transitory computer-readable storage medium storing computer executable code, where the code, when executed, causes a processor to implement any of aspects 24 to 37.

What is claimed is:

1. An apparatus for wireless communication at a user equipment (UE), comprising:
   memory; and
   one or more processors coupled to the memory and configured to cause the UE to:
      receive an indication associated with an interruption for a satellite-based communication link, wherein the indication indicates a time period that includes a time period duration and a starting time offset for a future time;
      determine the interruption for the satellite-based communication link based in part on UE location information and blockage information of an obstruction that blocks line-of-sight (LOS) propagation for the satellite-based communication link; and
      refrain from performance of one or more communication link correction procedures for the time period associated with the interruption.

2. The apparatus of claim 1, wherein the one or more communication link correction procedures includes at least one of:
   a declaration of radio link failure (RLF);
   a radio resource control (RRC) connection release procedure;
   a new satellite search procedure; or
   a beam search procedure.

3. The apparatus of claim 1, further comprising:
   at least one antenna coupled to the one or more processors, wherein the one or more processors are further configured to cause the UE to:
      refrain from monitoring of downlink communication for the time period;
      refrain from transmission of an uplink communication for the time period; and
      resume communication via the satellite-based communication link after the time period associated with the interruption is complete.

4. The apparatus of claim 1, wherein the starting time offset received in the indication is for a current time, and wherein the one or more processors are further configured to cause the UE to:
   initiate a timer after reception of the indication.

5. The apparatus of claim 1, wherein the indication indicates to the UE to transition to a sleep mode for a duration of time based on the time period.

6. The apparatus of claim 1, wherein the indication indicates to the UE to refrain from the performance of the one or more communication link correction procedures for a duration of time based on the time period.

7. An apparatus for wireless communication at a user equipment (UE), comprising:
   memory; and
   one or more processors coupled to the memory and configured to cause the UE to:
      detect an interruption for a satellite-based communication link based on UE location information and blockage information of an obstruction that blocks line-of-sight (LOS) propagation for the satellite-based communication link;
      predict a time period associated with the interruption;
      transmit an indication of the time period; and
      refrain from performance of one or more communication link correction procedures for the time period associated with the interruption.

8. The apparatus of claim 7, wherein the one or more processors are further configured to cause the UE to:
   access the blockage information via a digital map.

9. The apparatus of claim 7, wherein the indication indicates the time period that includes a time period duration and a starting time offset for a future time.

10. The apparatus of claim 7, wherein the indication indicates the time period that includes a time period duration and a starting time offset for a current time.

11. The apparatus of claim 7, wherein the indication indicates a duration of time that the UE is unavailable for communication via the satellite-based communication link, wherein the duration of time is based on the time period.

12. The apparatus of claim 7, wherein the one or more communication link correction procedures includes at least one of:
   a declaration of radio link failure (RLF);
   a radio resource control (RRC) connection release procedure;
   a new satellite search procedure; or
   a beam search procedure.

13. The apparatus of claim 7, further comprising:
   at least one antenna coupled to the one or more processors, wherein the one or more processors are further configured to cause the UE to:
      refrain from monitoring of downlink communication for the time period;

refrain from transmission of an uplink communication for the time period; and resume communication via the satellite-based communication link after the time period associated with the interruption is complete.

14. A method of wireless communication at a user equipment (UE), comprising:
receive an indication associated with an interruption for a satellite-based communication link, wherein the indication indicates a time period including a time period duration and a starting time offset for a future time;
determining the interruption for the satellite-based communication link based in part on UE location information and blockage information of an obstruction that blocks line-of-sight (LOS) propagation for the satellite-based communication link; and
refraining from performance of one or more communication link correction procedures for the time period associated with the interruption.

15. The method of claim 14, wherein the one or more communication link correction procedures includes at least one of:
a declaration of radio link failure (RLF);
a radio resource control (RRC) connection release procedure;
a new satellite search procedure;
a beam search procedure;
monitoring of downlink communication during the time period; or
transmission of an uplink communication during the time period.

16. An apparatus for wireless communication at a network entity, comprising:
memory; and
one or more processors coupled to the memory and configured to cause the network entity to:
receive an indication associated with an interruption for a satellite-based communication link, wherein the indication indicates a time period that includes a time period duration and a starting time offset for a future time;
determine the interruption for the satellite-based communication link with a user equipment (UE) based in part on UE location information and blockage information of an obstruction that blocks line-of-sight (LOS) propagation for the satellite-based communication link; and
refrain from scheduling of communication with the UE for the time period associated with the interruption.

17. The apparatus of claim 16, wherein the one or more processors are further configured to cause the network entity to:
resume the scheduling of the communication with the UE via the satellite-based communication link after the time period associated with the interruption is complete.

18. The apparatus of claim 16, wherein the starting time offset indicated by the indication is for a current time.

19. The apparatus of claim 16, wherein the indication indicates a duration of time that the UE is unavailable for the communication via the satellite-based communication link, wherein the duration of time is based on the time period.

20. An apparatus for wireless communication at a network entity, comprising:
memory; and
one or more processors coupled to the memory and configured to cause the network entity to:
detect an interruption for a satellite-based communication link with a user equipment (UE) based on UE location information and blockage information of an obstruction that blocks line-of-sight (LOS) propagation for the satellite-based communication link;
predict a time period associated with the interruption;
provide an indication of the time period; and
refrain from scheduling communication with the UE for the time period associated with the interruption.

21. The apparatus of claim 20, wherein the one or more processors are further configured to cause the network entity to:
access the blockage information via a digital map.

22. The apparatus of claim 20, wherein the indication indicates the time period that includes a time period duration and a starting time offset for a future time or a current time.

23. The apparatus of claim 20, wherein the indication indicates to the UE to transition to a sleep mode for a duration of time based on the time period.

24. The apparatus of claim 20, wherein the indication indicates to the UE to refrain from performance of one or more communication link correction procedures for a duration of time based on the time period.

25. A method of wireless communication at a network entity, comprising:
receiving an indication associated with an interruption for a satellite-based communication link, wherein the indication indicates a time period including a time period duration and a starting time offset for a future time;
determining the interruption for the satellite-based communication link with a user equipment (UE) based in part on UE location information and blockage information of an obstruction that blocks line-of-sight (LOS) propagation for the satellite-based communication link; and
refraining from scheduling of communication with the UE for the time period associated with the interruption.

26. The method of claim 25, further comprising:
resuming the scheduling of the communication with the UE via the satellite-based communication link after the time period associated with the interruption is complete.

27. A method of wireless communication at a network entity, comprising:
detecting an interruption for a satellite-based communication link with a user equipment (UE) based on UE location information and blockage information of an obstruction that blocks line-of-sight (LOS) propagation for the satellite-based communication link;
predicting a time period associated with the interruption;
providing an indication of the time period; and
refraining from scheduling communication with the UE for the time period associated with the interruption.

28. The method of claim 27, further comprising:
resuming the scheduling communication with the UE via the satellite-based communication link after the time period associated with the interruption is complete.

29. A method of wireless communication at a user equipment (UE), comprising:
detecting an interruption for a satellite-based communication link based on UE location information and blockage information of an obstruction that blocks line-of-sight (LOS) propagation for the satellite-based communication link;
predicting a time period associated with the interruption;
transmitting an indication of the time period; and refraining from performance of one or more communication link correction procedures for the time period associated with the interruption.

30. The method of claim 29, wherein the one or more communication link correction procedures includes at least one of:
- a declaration of radio link failure (RLF);
- a radio resource control (RRC) connection release procedure;
- a new satellite search procedure;
- a beam search procedure;
- monitoring of downlink communication during the time period; or
- transmission of an uplink communication during the time period.

* * * * *